US012200443B2

(12) United States Patent
Kim et al.

(10) Patent No.: US 12,200,443 B2
(45) Date of Patent: Jan. 14, 2025

(54) SOT MODULE

(71) Applicant: MICHIHIRO CO., Ltd, Tokyo (JP)

(72) Inventors: Kyungsu Kim, Tokyo (JP); Jun Oyakawa, Tokyo (JP); Michihiro Yagi, Tokyo (JP); Shinobu Nakamura, Tokyo (JP)

(73) Assignee: MICHIHIRO CO., Ltd, Tokyo (JP)

( * ) Notice: Subject to any disclaimer, the term of this patent is extended or adjusted under 35 U.S.C. 154(b) by 0 days.

(21) Appl. No.: 18/567,424

(22) PCT Filed: Nov. 10, 2021

(86) PCT No.: PCT/JP2021/041263
§ 371 (c)(1),
(2) Date: Dec. 6, 2023

(87) PCT Pub. No.: WO2023/084623
PCT Pub. Date: May 19, 2023

(65) Prior Publication Data
US 2024/0284118 A1 Aug. 22, 2024

(51) Int. Cl.
*H04R 17/00* (2006.01)
*H04R 7/04* (2006.01)

(52) U.S. Cl.
CPC ............ *H04R 17/00* (2013.01); *H04R 7/045* (2013.01); *H04R 2440/01* (2013.01); *H04R 2499/13* (2013.01)

(58) Field of Classification Search
CPC .... H04R 17/00; H04R 7/045; H04R 2440/01; H04R 2499/13
See application file for complete search history.

(56) References Cited

U.S. PATENT DOCUMENTS 11,166,108 B2 11/2021 Kim et al.
2003/0173874 A1* 9/2003 Bryant .................. H04R 17/00 310/365

(Continued)

FOREIGN PATENT DOCUMENTS

JP 3798678 B 7/2006
JP 2015-149632 A 8/2015

(Continued)

OTHER PUBLICATIONS

Korean Office action issued in corresponding Korean patent application No. 10-2023-7042933 Mar. 28, 2024, Korea, 8 pages.

(Continued)

*Primary Examiner* — Mark Fischer
(74) *Attorney, Agent, or Firm* — ASLAN LAW, P.C.

(57) ABSTRACT

Sufficient sound pressure is obtained in the mid-low range, to provide a SoT module 100 which can be applied to a variety of applications. A SoT module 100 comprises a plate-shaped piezoelectric composite 105 for generating bending vibration by the impression of an AC voltage, a plurality of elastic bodies, one ends of which are bonded to the main surface of the piezoelectric composite 105, the elastic bodies 120*a* and 120*b* transmitting vibration of the piezoelectric composite 105 and a vibration plate 130 has a main surface which is bonded to the other ends of the elastic bodies 120*a* and 120*b*, wherein the piezoelectric composite 105 comprises piezoelectric elements 110*a*, 110*b* formed in a rectangular plate, and there is a position of the centroid of the piezoelectric composite 105 between the plurality of elastic bodies 120*a* and 120*b*.

6 Claims, 26 Drawing Sheets

(56) References Cited

U.S. PATENT DOCUMENTS

| | | | |
|---|---|---|---|
| 2009/0045700 A1 | 2/2009 | Sasaki et al. | |
| 2010/0165794 A1 | 7/2010 | Takahashi et al. | |
| 2012/0099746 A1 | 4/2012 | Fujise | |
| 2020/0314553 A1 | 10/2020 | Kim et al. | |
| 2021/0176566 A1 | 6/2021 | Ye | |
| 2021/0266678 A1* | 8/2021 | Miyoshi | H04R 17/005 |
| 2021/0400394 A1 | 12/2021 | Kim et al. | |
| 2022/0132236 A1* | 4/2022 | Ye | H04R 1/227 |
| 2022/0217472 A1 | 7/2022 | Ye et al. | |

FOREIGN PATENT DOCUMENTS

| | | | |
|---|---|---|---|
| JP | 2020-167360 A | 10/2020 | |
| JP | 2021-016118 A | 2/2021 | |
| JP | 2021-090141 A | 6/2021 | |
| JP | 2022-106029 A | 7/2022 | |
| KR | 10-2017-0113637 A | 10/2017 | |
| WO | WO-0150810 A1 * | 7/2001 | B06B 1/0688 |
| WO | WO 2007/102305 A1 | 9/2007 | |
| WO | WO 2008/146678 A1 | 12/2008 | |
| WO | WO-2010106736 A1 * | 9/2010 | H04R 17/00 |

OTHER PUBLICATIONS

International Search Report issued in PCT Application No. PCT/JP2021/041263, WIPO/JPO, Dec. 28, 2021, 5 pages.

Written Opinion of the International Searching Authority, WIPO, Dec. 28, 2021, 4 pages.

International Preliminary Report issued in PCT Application No. PCT/JP2021/041263, WIPO, Feb. 8, 2023, 5 pages.

JP Office Action issued in JP patent application No. 2023-513174, JPO, Japan, Apr. 18, 2023, 3 pages.

* cited by examiner

SOT MODULE

TECHNICAL FIELD

The present invention relates to a SoT module comprising a piezoelectric element formed in a rectangular plate.

BACKGROUND ART

In the acoustic field, a dynamic speaker configured by a coil are generally used. Although a dynamic speaker can generate sufficient sound pressure even in the low audio frequency range, the application is limited since the weight, the volume and the power consumption of the dynamic speaker are large. On the other hand, the application of the piezoelectric speaker using the piezoelectric element has been advanced (e.g., see Patent Document 1). Since the volume, the weight and the power consumption of a piezoelectric speaker are small, the piezoelectric speaker can also be used in applications difficult to apply dynamic speakers.

PRIOR ART DOCUMENTS

Patent Document

[Patent Document 1] Japanese Patent No. 3798678

SUMMARY OF INVENTION

Technical Problem

However, in the piezoelectric speaker, it is difficult to obtain a sufficient sound pressure in the low and middle audio frequency range. As a result, the sound pressure as a whole is often reduced. If the demerit is overcome, the piezoelectric module can be applied not only to speakers for watching television programs, movies, music, and the like, but also to various applications. A piezoelectric module that can obtain sufficient sound pressure in the low and middle audio frequency range is available for a loudspeaker and noise canceller, even if it does not have an acoustic structure such as a hole and cavity, as long as it has a vibration plate.

Such a piezoelectric module has the potential to be quite different from a conventional piezoelectric module and should be referred to as a SoT (Sound of Things) module (hereinafter, piezoelectric modules that can improve sound pressure in a particular audio frequency range are referred to as a SoT module).

From the above circumstances, the inventors of the present invention have continued trial and error in the development of a piezoelectric module by which sufficient sound pressure is obtained even in the low and middle audio frequency range. For example, in the piezoelectric module 2100 shown in FIG. 25, on the vibration plate 2130, the piezoelectric element 2110 is provided with a central portion supported by the elastic body 2120. As the material of the elastic body 2120 and the vibration plate 2130 of such piezoelectric module 2100, various materials have been tried.

Also, an attempt to increase the sound pressure by providing a plurality of piezoelectric elements has been made. In the piezoelectric module 3100 shown in FIG. 26, the sound pressure is increased by providing two piezoelectric elements 3110*a* and 3110*b* in parallel supported at the centers by elastic bodies 3120*a* and 3120*b*. However, even in such improved piezoelectric module 3100, sufficient sound pressure has not been obtained in the low and middle audio frequency range.

The present invention has been made in view of such circumstances, a SoT module that generates sufficient sound pressure in the low and middle audio frequency range and can be applied to a variety of applications is provided.

Solution to Problem

To achieve the above object, SoT module comprises a plate-shaped piezoelectric composite for generating bending vibration by the impression of an AC voltage, a plurality of elastic bodies, one ends of which are bonded to the main surface of the piezoelectric composite, the elastic bodies transmitting vibration of the piezoelectric composite and a vibration plate has a main surface which is bonded to the other ends of the elastic bodies, wherein the piezoelectric composite comprises a piezoelectric element formed in a rectangular plate, and there is a position of the centroid of the piezoelectric composite between the plurality of elastic bodies. Thus, the stiffness of the entire module can be reduced, and the displacement amplitude of the vibration plate can be increased. As a result, sufficient sound pressure is obtained in the low and middle audio frequency range, and it can be applied to various applications.

DESCRIPTION OF EMBODIMENTS

Next, embodiments of the present invention are described with reference to the drawings.

1st Embodiment (Parallel Type)

(Configuration of SoT Module)

Figure 1:
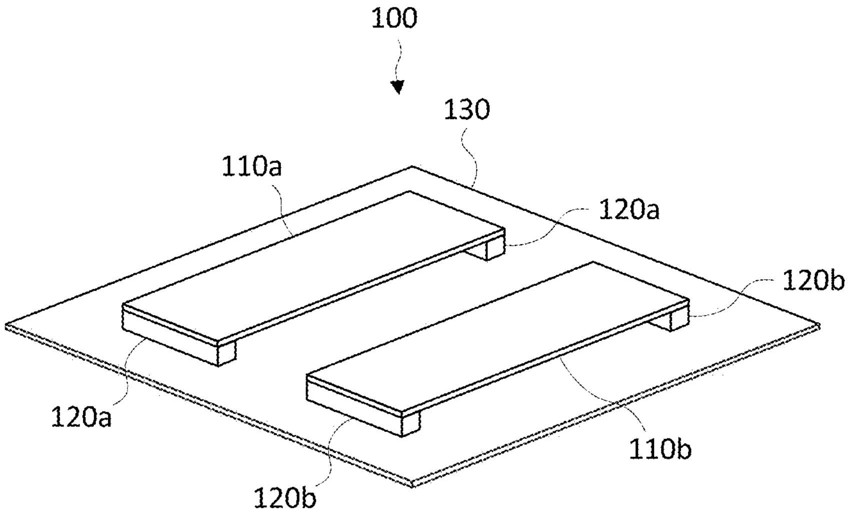
FIG. 1 is a perspective view showing a SoT module according to the first embodiment.

FIG. 1 is a perspective view showing a SoT module 100. The SoT module 100 comprises piezoelectric elements 110*a* and 110*b*, elastic bodies 120*a* and 120*b* and a vibration plate 130. Each of the piezoelectric elements 110*a* and 110*b* is formed bending-type in a rectangular plate and generates flexural vibration by impression of an AC voltage.

The piezoelectric elements 110*a* and 110*b* are arranged in parallel and are not connected to each other. Between the elastic bodies 120*a* and 120*b* is the position of the centroid of each of the piezoelectric elements 110*a* and 110*b*. As a result, sufficient sound pressure is obtained in the low and middle audio frequency range, SoT module 100 can be applied to a variety of applications. Each of the piezoelectric elements 110*a* and 110*b* configures a piezoelectric composite.

(1) Piezoelectric Element

Figure 2:
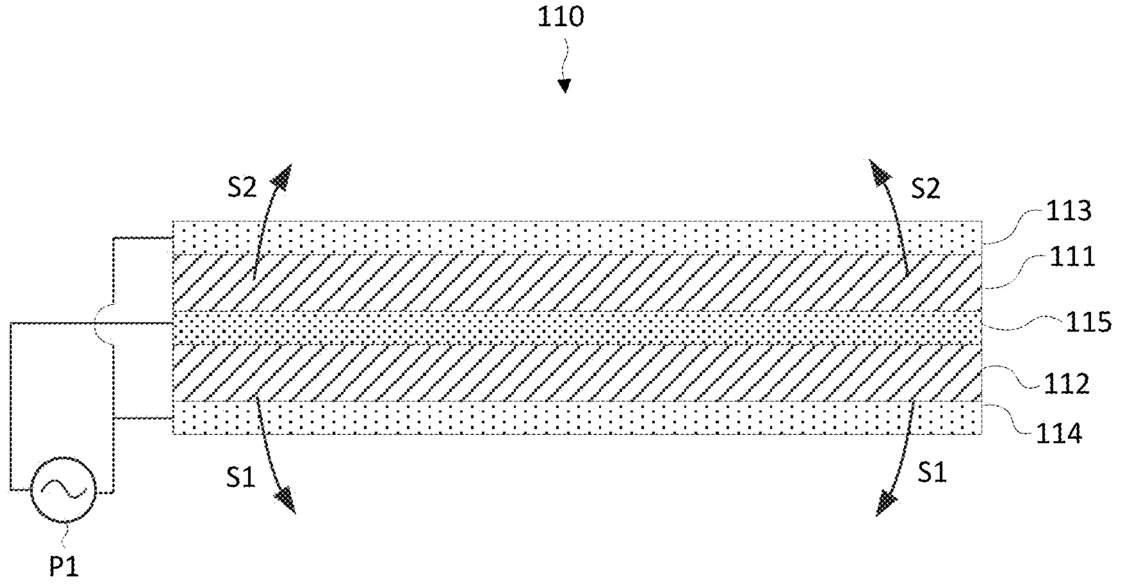
FIG. 2 is a cross-sectional view showing an example of a configuration and operation of the piezoelectric element.

FIG. 2 is a cross-sectional view showing an example of the configuration and operation of the piezoelectric element 110. The piezoelectric element 110 is an example of the configuration of the piezoelectric elements 110*a* and 110*b*. The piezoelectric element 110 comprises piezoelectric bodies 111 and 112, electrodes 113 and 114 and shim plate 115. The shim plate 115 is made of metal and also has the function of an electrode.

The piezoelectric bodies 111 and 112 are preferably formed of a piezoelectric ceramic material. As the piezoelectric material, for example, zirconate titanate ($Pb(Ti,Zr)O_3$, so-called PZT) or barium titanate ($BaTiO_3$) is used. Both are ferroelectrics, and PZT is preferable from the viewpoint of efficiency, but barium titanate is preferable from the viewpoint of lead-free. The piezoelectric bodies 111 and 112 may be formed of a piezoelectric polymer. Piezoelectric polymers comprise polyvinylidene fluoride and copolymers thereof, polylactic acid, polyvinylidene cyanide, polyurea and odd nylon.

Piezoelectric body 111 is polarized in the direction of the shim n plate 115 from the electrode 113, the piezoelectric body 112 is polarized in the direction of the electrode 114 from the shim plate 115. One electrode is connected to the electrodes 113 and 114, and the other electrode is connected to the shim plate 115. In this configuration, when an AC voltage is impressed to the piezoelectric bodies 111 and 112 by the power supply P1, one contracts and the other extends along a direction parallel to the surface by the reverse piezoelectric effect, and then the bending vibration occurs by repeating the movement shown as the arrow S1 and S2 in FIG. 2.

The above-described piezoelectric element 110 has a parallel bimorph structure in which the polarization directions of the piezoelectric bodies 111 and 112 are the same but may have a series bimorph structure in which the polarization directions are different. Further, an insulator may be used for the central shim plate. The piezoelectric element 110 preferably has a bimorph structure but may have a unimorph structure. Further, for the piezoelectric element 110, a piezoelectric multilayer body may be used in place of the piezoelectric body of a single plate. In this case, an external electrode may be used, or an electrode may be formed by a via structure. Further, the piezoelectric element 110 is formed by the piezoelectric layer and the electrode being stacked, it may be a stretching-type piezoelectric element which expands and contracts in the stacking direction.

(2) Elastic Body

The elastic body 120*a* has one end bonded to the main surface of the piezoelectric element 110*a* and the other end bonded to the main surface of the vibration plate 130, and the elastic body 120*b* has one end bonded to the main surface of the piezoelectric element 110*b* and the other end bonded to the main surface of the vibration plate 130. For example, an epoxy-based, acrylic-based, or urethane-based adhesive can be used for bonding (hereinafter, for any bonding is the same). The elastic bodies 120*a* and 120*b* are preferably formed of a resin such as urethane. The elastic modulus of the elastic bodies 120*a* and 120*b* is preferably 70 MPa or more and 690 MPa or less. The elastic bodies 120*a* and 120*b* transmit the displacement of the piezoelectric elements 110*a* and 110*b* to the vibration plate 130.

Between the elastic bodies 120*a* and 120*b*, the position of the centroid for each of the piezoelectric elements 110*a* and 110*b* is preferably located. Thus, the stiffness of the entire SoT module 100 can be reduced, and the peak dip in the middle audio frequency range occurred for the piezoelectric elements 110*a* and 110*b* in which the natural frequency is set to be small can be eliminated. It is particularly preferable that the elastic bodies 120*a* and 120*b* are bonded to respective ends of the piezoelectric elements 110*a* and 110*b*. For each of the piezoelectric elements 110*a* and 110*b*, the region can be divided into a central portion, two intermediate portions, and two end portions.

Each of the elastic bodies 120*a* and 120*b* is preferably formed in a rectangular shape as shown in FIG. 1 but may be formed in a cylindrical shape or an elliptical cylindrical shape. The elastic bodies 120*a*, 120*b* are preferably symmetrical in shape and arrangement with respect to the piezoelectric elements 110*a*, 110*b* to be bonded.

(3) Vibration Plate

The vibration plate 130 is formed in a plate shape and bonded to the elastic bodies 120*a* and 120*b*. The material of the vibration plate 130 varies depending on the application. For example, a styrene board can be used as the vibration plate 130. Further, it is possible to use a OLED panel as the vibration plate 130 of the TV speaker. Although the vibration plate 130 made of resin is easily used, a vibration plate with inelasticity enhanced using wood or fiber structure may be used.

The vibration plate 130 vibrates in the thickness direction by the displacement force transmitted through the elastic bodies 120*a* and 120*b*, vibrates air and generates sound waves. Depending on the frequency of the signal and the intensity of the current applied to the piezoelectric elements 110*a* and 110*b*, the pitch and the sound pressure of the sound generated from the vibration plate 130 appear differently for magnitude. In order to generate a large sound pressure, it is effective to improve the efficiency of vibration which is connected to the vibration plate.

(Operation of SoT Module)

The operation of the SoT module 100 is described below. By the electrical signal for the sound amplified by the amplifier being input to the SoT module 100, the piezoelectric composite 105 vibrates. Then, the displacement due to the vibration is transmitted to the vibration plate 130 via the elastic bodies 120*a* and 120*b*, and the vibration plate 130 vibrates to generate a sound corresponding to the electric signal.

The unconnected piezoelectric elements 110*a* and 110*b* are preferably driven in anti-phase or in-phase. The stiffness of the whole path transmitted by vibration and a combination of the phase driving each piezoelectric element is determined according to the required characteristics such as the sound pressure in the low audio frequency range. The stiffness of the whole path is determined by each element. For example, even when the stiffness of the piezoelectric elements 110*a* and 110*b* and the vibration plate 130 is large, when the stiffness of the elastic bodies 120*a* and 120*b* is small, the stiffness of the whole path may be small.

2nd Embodiment (End Connected Type)

(Configuration of SoT Module)

Figure 3:
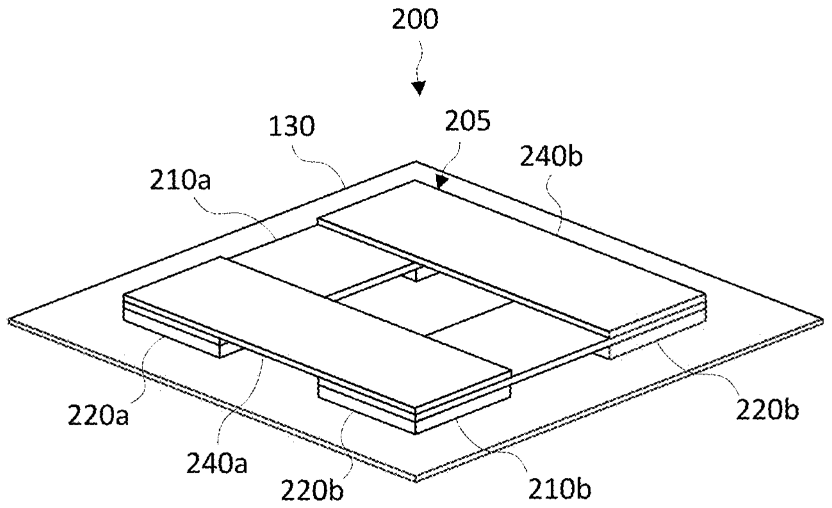
FIG. 3 is a perspective view showing a SoT module according to the second embodiment.

Although the independent two piezoelectric elements are arranged in parallel in the above embodiment, the piezoelectric elements installed in parallel may be connected by connecting members. FIG. 3 is a perspective view showing the SoT module 200.

The SoT module 200 comprises piezoelectric elements 210*a* and 210*b*, elastic bodies 220*a* and 220*b*, connecting members 240*a* and 240*b* and a vibration plate 130. The piezoelectric elements 210*a* and 210*b* have the same configuration as the piezoelectric elements 110*a* and 110*b*, respectively. However, the piezoelectric elements 210*a* and 210*b* are provided in parallel with each other on the vibration plate 130, and a part of each other is connected to configure a plate-shaped piezoelectric composite 205. Thus, the vibration is amplified through the connecting portion, the displacement amplitude of the vibration plate 130 can be increased. Each of the elastic bodies 220*a* and 220*b* is formed of the same material in a rectangular plate shape and arranged as each of the elastic bodies 120*a* and 120*b*.

Each of the two connecting members 240*a* and 240*b* is formed of resin such as PET in a flat plate shape and connects the end of the piezoelectric element 210*a* and the end of the piezoelectric element 210*b*. The connecting is performed by bonding the back surfaces of the connecting members 240*a* and 240*b* and the surfaces of the piezoelectric elements 210*a* and 210*b* to each other. The connecting members 240*a* and 240*b* are arranged so that their longitudinal directions do not intersect each other and are preferably parallel to each other. The thickness of the connecting members 240*a* and 240*b* is designed according to the overall configuration, for example, 100 μm or more and 1000 μm or less. The piezoelectric elements 210*a* and 210*b* and the connecting members 240*a* and 240*b* configure the piezoelectric composite 205. In the cross-sectional view, the electrodes of the piezoelectric elements 210*a* and 210*b* are omitted.

(Operation of SoT Module)

It is preferable that the piezoelectric elements 210*a* and 210*b* are wired so as to be driven in in-phase or anti-phase to each other. That is, the piezoelectric elements 210*a* and 210*b* are wired so as to be driven in in-phase or anti-phase, and electric signals are input thereto. Thus, vibration of the piezoelectric elements 210*a* and 210*b* can be amplified via the connecting members 240*a* and 240*b*, and the sound pressure in the low audio frequency range to the middle audio frequency range can be improved. Either in-phase or anti-phase may be selected depending on the combination of the required characteristics and the stiffness of the whole path transmitted by the vibration.

(1) Anti-Phase Drive

For example, the piezoelectric elements 210*a* and 210*b* are wired so as to be driven in anti-phase to each other, and electric signals can be input. The respective piezoelectric elements 210*a* and 210*b* are driven in anti-phases with respect to the SoT module 200 in which the piezoelectric composite 205 is located on the upper side and the vibration plate 130 is located on the lower side. In this case, when the central portion of the piezoelectric element 210*a* is displaced downward, the central portion of the piezoelectric element 210*b* is displaced upward.

(2) In-Phase Drive

The piezoelectric elements 210*a* and 210*b* may be wired so as to be driven in phase with each other, and electric signals may be input. In the case that each piezoelectric element is driven in phase, when the center portion of the piezoelectric element 210*a* is displaced downward, the center portion of the piezoelectric element 210*b* is also displaced downward. When the central portion of the piezoelectric element 210*a* is displaced upward, the central portion of the piezoelectric element 210*b* is also displaced upward.

The SoT module 200 is preferably driven by a drive method for increasing the sound pressure of the low audio frequency range. When the displacement of the piezoelectric composite 205 with respect to the position is represented by a curve and the curve is overlapped with the one in anti-phase, there is a position where the curves intersect. This position would be called a displacement point, and the displacement point can be changed closer to or farther from the elastic bodies 220*a* and 220*b* by adjusting the drive signals (the anti-phase or in-phase). This adjustment allows amplification of sound pressure at a specific frequency. In this way, a sufficient sound pressure can be obtained even in the low audio frequency range, for example.

3rd Embodiment (Plate-Shaped Elastic Body)

In the second embodiment, although the rectangular plate-shaped elastic body is provided only at the positions of both end portions of the piezoelectric element, the elastic body may be provided over the entire vibration plate. The elastic body may have a uniform plate shape or may be formed in a predetermined pattern as described later.

Figure 4A:
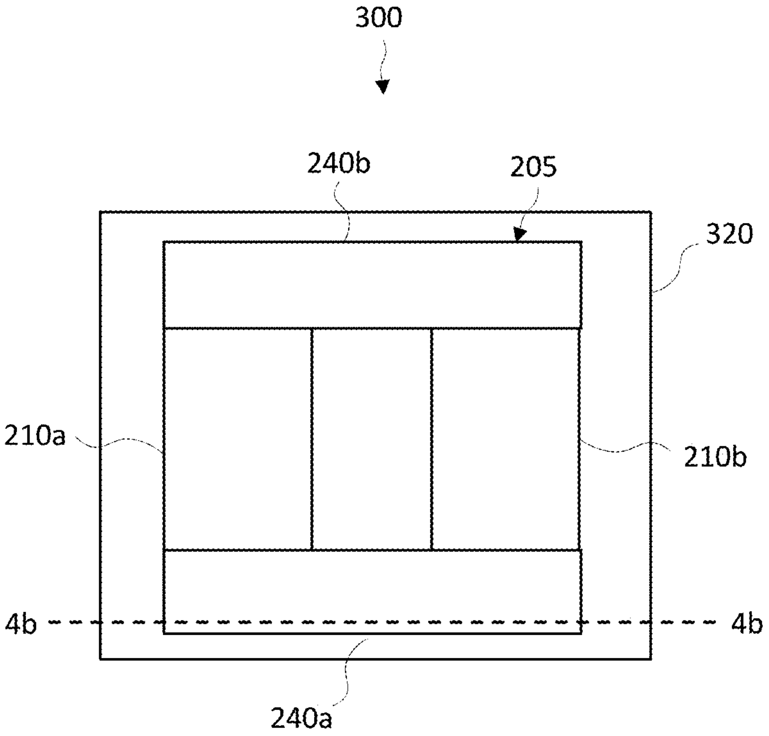
FIGS. 4A and 4B are a plan view and a cross-sectional view showing a SoT module according to the third embodiment, respectively.
Figure 4B:
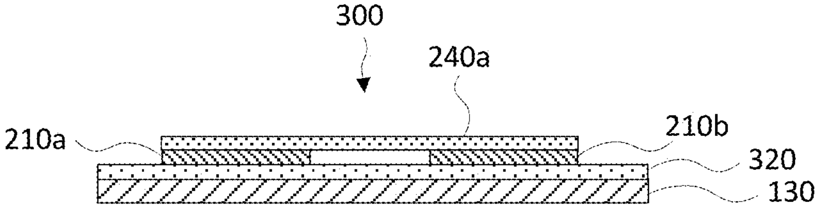

FIGS. 4A and 4B are plan and cross-sectional views showing the SoT module 300, respectively. The cross-sectional view of the FIG. 4B represents the cross-section 4*b* shown in FIG. 4A. The SoT module 300 is configured in the same manner as the SoT module 200 except for the elastic body 320.

On the other hand, the elastic body 320 is formed in a uniform plate shape over the entire vibration plate 130. Thus, since the elastic body 320 is easily arranged, the stiffness of the SoT module 300 can be reduced by the elastic body 320 while the manufacturing load is reduced. The operation of the SoT module 300 is the same as that of the SoT module 200.

4th Embodiment (Elastic Body with Circular Hole Patterns)

Figure 5A:
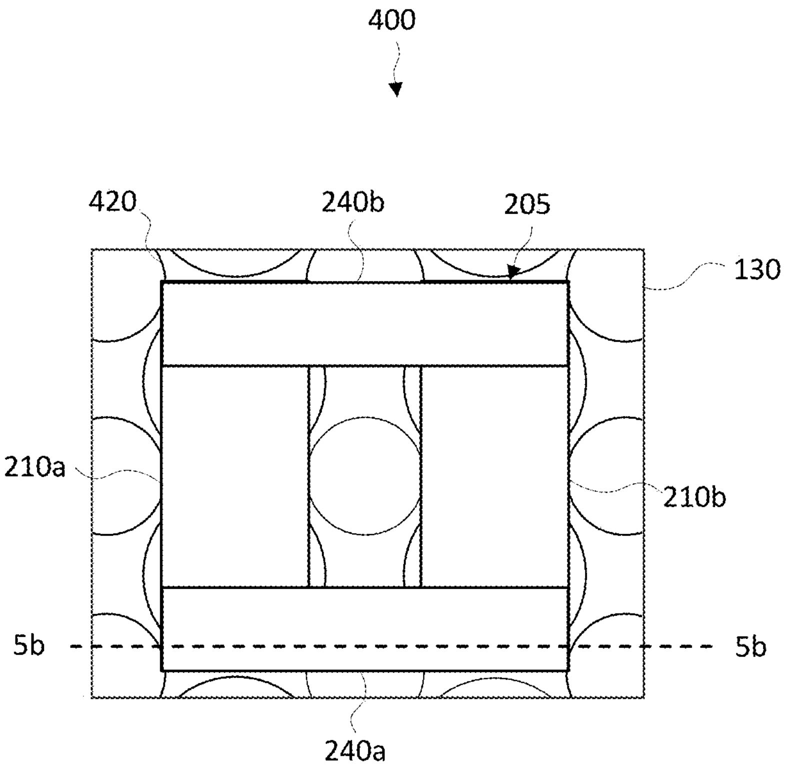
FIGS. 5A and 5B are a plan view and a cross-sectional view showing a SoT module according to the fourth embodiment, respectively.
Figure 5B:
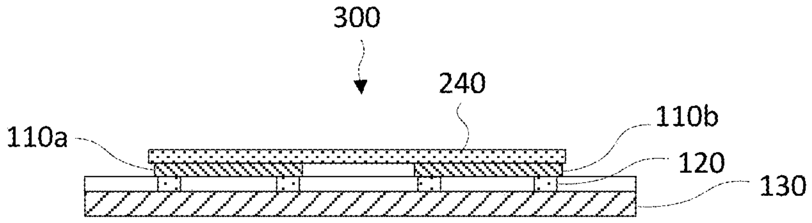

FIGS. 5A and 5B are plan and cross-sectional views showing the SoT module 400, respectively. The cross-sectional view of FIG. 5B represents the cross-section 5*b* shown in FIG. 5A. The SoT module 400 is configured in the same manner as the SoT module 300 except for the elastic body 420.

The elastic body 420 has a constant pattern shape over a cross section perpendicular to the thickness direction over the entire vibration plate 130. The constant pattern shape is preferably a shape in which a plurality of cylindrical holes are arranged periodically. Further, it is more preferable that a plurality of types of cylindrical holes having different diameters are provided. Thus, the constraint to the piezoelectric composite 205 becomes loose, and the displacement is not hindered. As a result, the stiffness S value of the whole system can be lowered, and the damping ratio of the vibration transmission path can be optimized.

Fifth Embodiment (Elastic Body with Spherical Pattern)

Figure 6A:
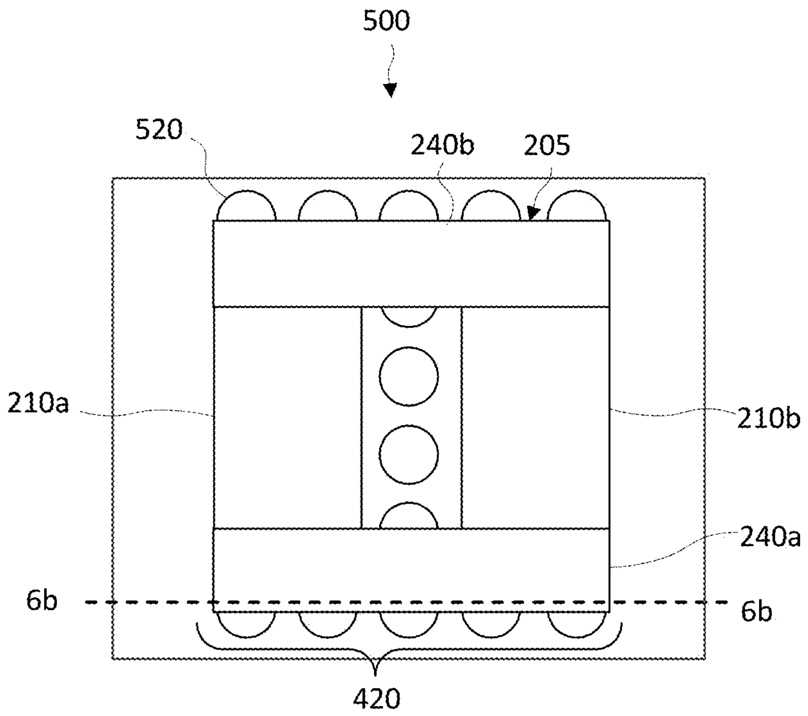
FIGS. 6A and 6B are a plan view and a cross-sectional view showing a SoT module according to a fifth embodiment, respectively.
Figure 6B:
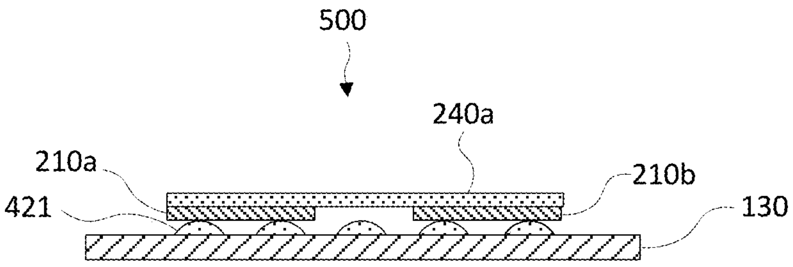

FIGS. 6A and 6B are a plan view and a cross-sectional view showing the SoT module 500 according to a fifth embodiment, respectively. The cross-sectional view of FIG. 6B represents the cross-section 6*b* shown in FIG. 6A. The SoT module 500 is configured in the same manner as the SoT module 300 except for the elastic body 520.

The elastic body 420 has a constant pattern shape on a cross section perpendicular to the thickness direction over the entire vibration plate 130. The constant pattern shape is preferably a shape in which a plurality of spherical projections or cylinders are arranged periodically. Thus, the constraint to the piezoelectric composite 205 becomes loose, and the displacement is not hindered. As a result, the stiffness S value of the whole system can be lowered, and the damping ratio of the vibration transmission path can be optimized.

6th Embodiment (H Type)

Although two piezoelectric elements are used in the above embodiment, three piezoelectric elements may be connected for the SoT module. In that case, the central portion of the SoT module installed in parallel can be connected by a piezoelectric element.

(Configuration of SoT Module)

Figure 7:
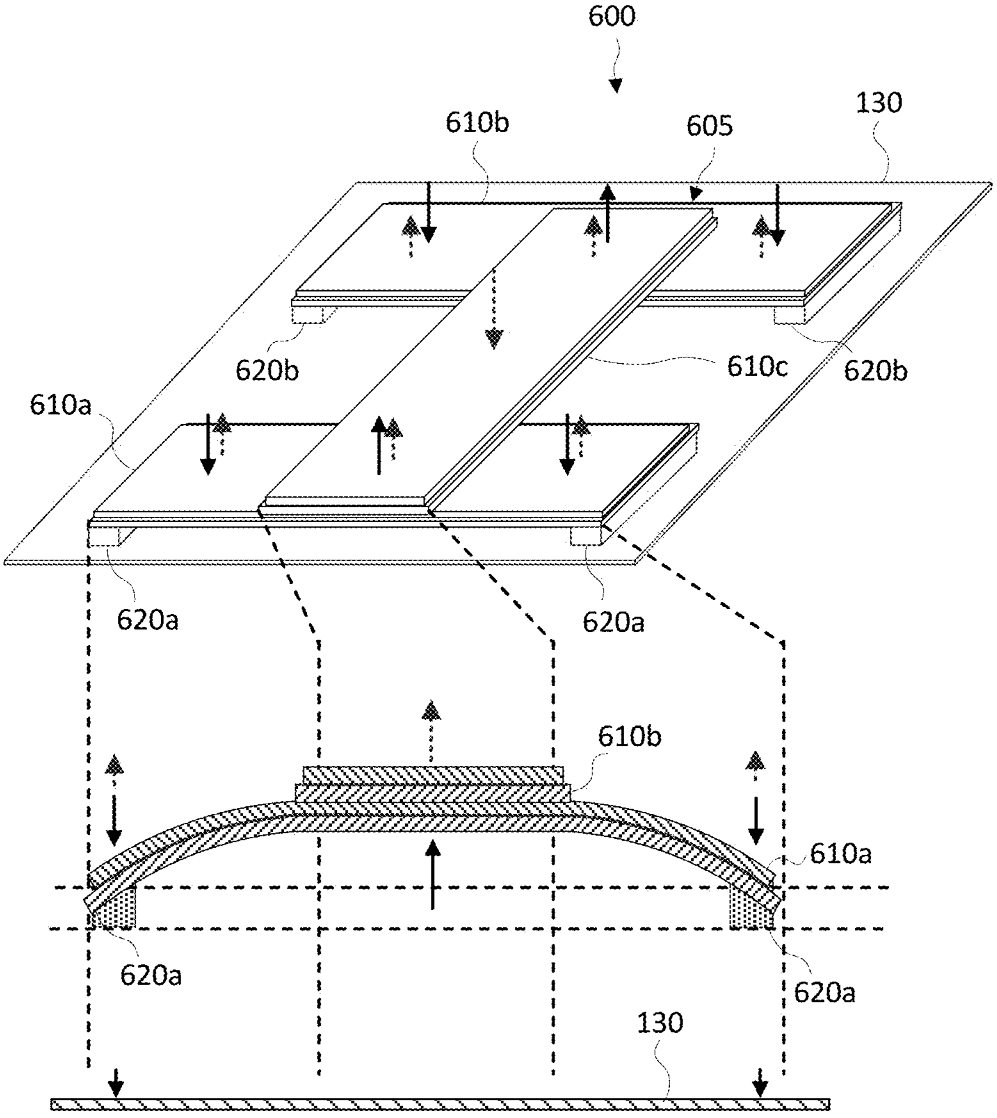
FIG. 7 is a schematic diagram showing an example of a configuration and an operation (in-phase) of a SoT module according to the sixth embodiment.
Figure 8:
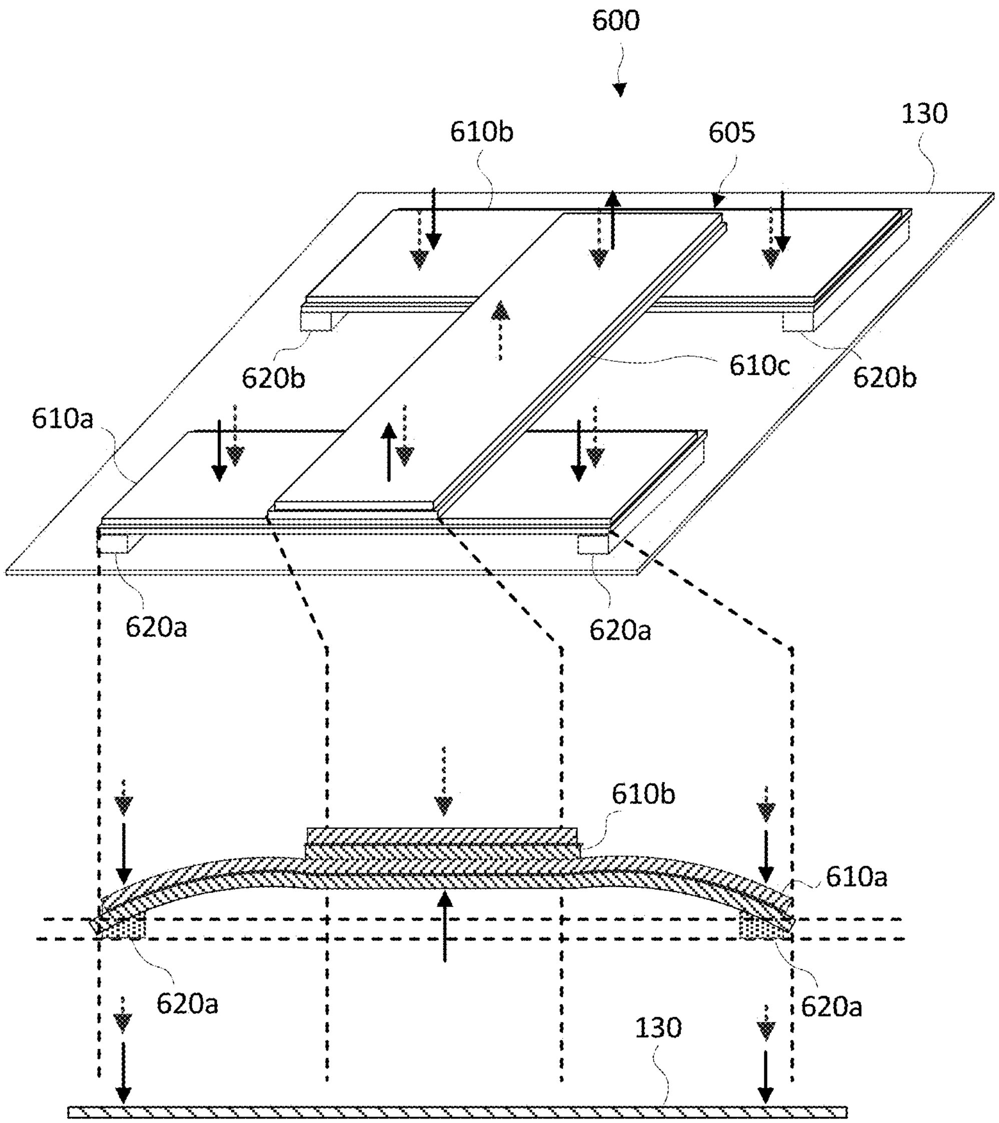
FIG. 8 is a schematic diagram showing an example of a configuration and an operation of a SoT module according to the sixth embodiment.

FIGS. 7 and 8 are schematic diagrams showing a configuration of the SoT module 600. Each of arrows in the figure shows the displacement of each piezoelectric element in accordance with the type of arrow (hereinafter the same). The SoT module 600 comprises piezoelectric elements 610*a* to 610*c*, elastic bodies 620*a* and 620*b*, and a vibration plate 130. Three piezoelectric elements 610*a* to 610*c* are connected in an H-shape to form a piezoelectric composite 605.

The piezoelectric elements 610*a* and 610*b* are configured in the same manner as the piezoelectric elements 210*a* and 210*b*, respectively. The elastic bodies 620*a* and 620*b* are formed of the same material and are arranged in the same manner as the elastic bodies 120*a* and 120*b*. The elastic bodies 620*a* and 620*b* support the piezoelectric elements 610*a* and 610*b* on the vibration plate 130, respectively, and transmit vibrations of the piezoelectric elements 610*a* and 610*b* to the vibration plate 130.

The piezoelectric element 610*c* has the same configuration as the piezoelectric element 610*a* and connects the center portions of the piezoelectric elements 610*a* and 610*b*. The connection is made by bonding the back surface of ends of the piezoelectric element 610*c* and the surface of the center portion of the piezoelectric elements 610*a* and 610*b*.

(Operation of SoT Module)

(1) In-Phase Drive

FIG. 7 is a schematic diagram showing an example of the operation of the SoT module 600. Electrical signals are input to the wiring configured so that the piezoelectric elements 610*a* to 610*c* are all driven in phase in the SoT module 600 in which the piezoelectric composite 605 is located on the upper side and the vibration plate 130 is located on the lower side. In the case, displacement occurs as indicated by the arrow shown in FIG. 7, it is possible to obtain a large displacement of the entire piezoelectric composite 605. In the case that the piezoelectric elements are driven in phase with each other, when the center portions of the piezoelectric elements 610*a* and 610*b* are displaced upward, both ends of the piezoelectric element 610*c* are displaced downward, and the center portion is displaced upward.

(2) Anti-Phase Drive

The wiring may be configured so that the piezoelectric elements 610*a* and 610*b* can be driven in anti-phases to the piezoelectric element 610*c* each other, and an electric signal may be input. FIG. 8 is a schematic diagram showing an operation example of the SoT module 600. In this case, a displacement occurs as indicated by an arrow in FIG. 8, and a large displacement can be obtained in the entire piezoelectric composite 605. When the center portions of the piezoelectric elements 610*a* and 610*b* are displaced upward, both ends of the piezoelectric element 610*c* are displaced upward, and the center portion is displaced downward.

when the curves of the displacements of the piezoelectric composite 605 in anti-phases are overlapped and the position where the curves intersect is called a displacement point, the displacement point can be changed closer to or farther from the elastic bodies 620*a* and 620*b* by adjusting the drive signal (anti-phase or in-phase). This adjustment allows amplification of sound pressure at a specific frequency. By thus amplifying the displacement of the piezoelectric composite 605 and transmitting vibration to the vibration plate 130, it is possible to improve the sound pressure of the low audio frequency range.

7th Embodiment (Central Connection Loop Type)

In the above embodiments, there is a termination in the amplification path of the displacement of the piezoelectric element, but the SoT module may have a structure for amplifying the displacement in a loop. In the following example, four piezoelectric elements are used from the viewpoint of efficiency, but other numbers of piezoelectric elements such as three or five may be used.

Figure 9A:
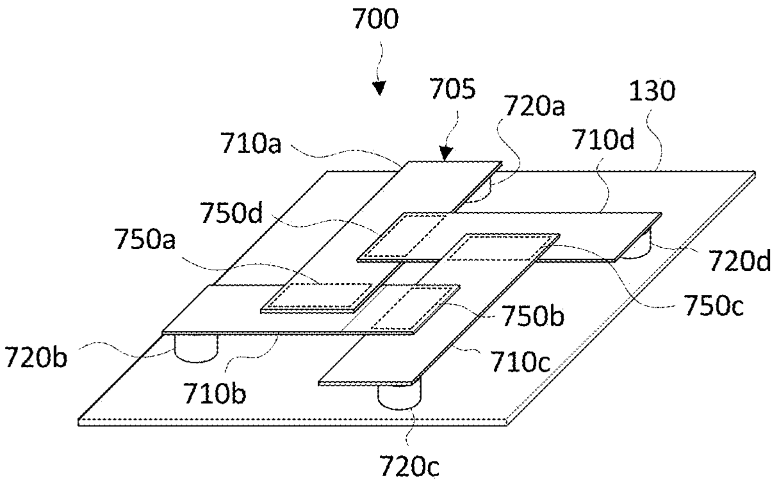
FIGS. 9A to 9C are a perspective view, a schematic view, a side view showing an operation of a SoT module according to the seventh embodiment, respectively.
Figure 9B:
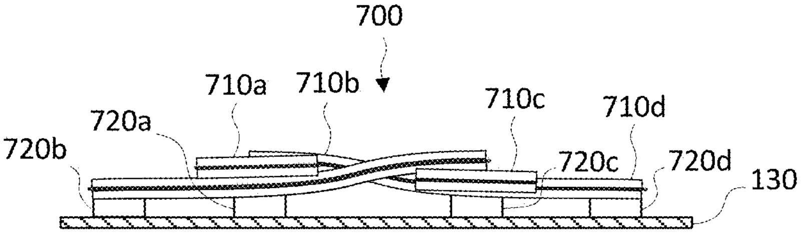
Figure 9C:
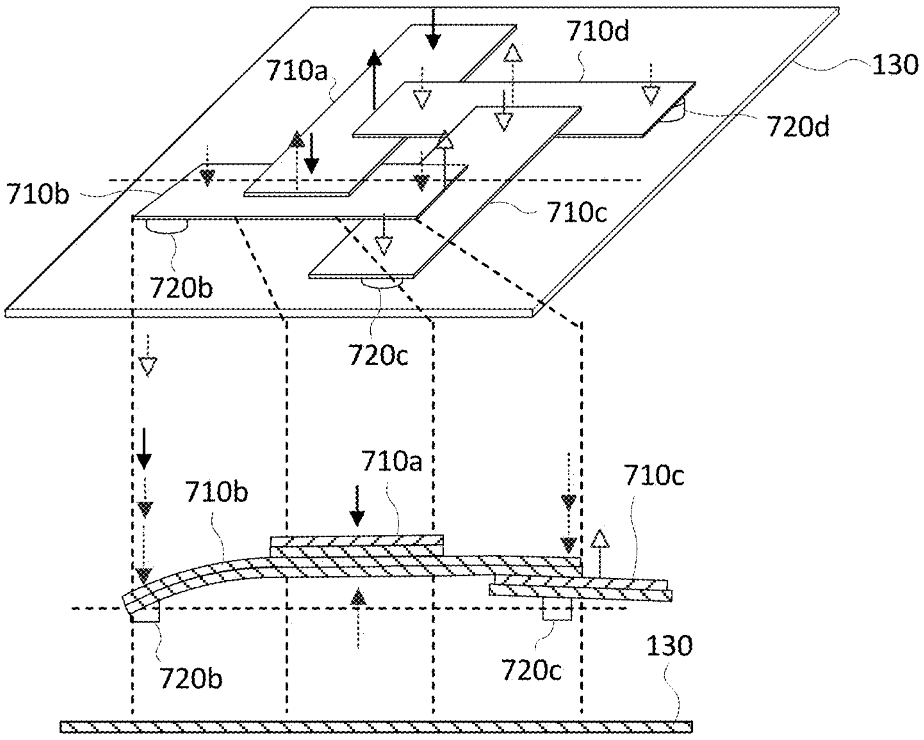

FIGS. 9A to 9C are a perspective view, a schematic view, a side view showing an operation of the SoT module 700, respectively. The SoT module 700 comprises piezoelectric elements 710*a* to 710*d*, elastic bodies 720*a* to 720*d*, and a vibration plate 130. Each of the piezoelectric elements 710*a* to 710*d* has the same element structure as that of the piezoelectric element 110*a*. Four piezoelectric elements 710*a* to 710*d* are connected in a loop structure to form piezoelectric composite 705.

The connection is performed, for example, by bonding the back surface of one end of the piezoelectric element 710*a* and the front surface of the center portion of the piezoelectric element 710*b*. A region surrounded by a dotted line in FIG. 9A is a bonding region. Such connections are performed between the piezoelectric elements 710*b* and 710*c*, the piezoelectric elements 710*c* and 710*d*, and the piezoelectric elements 710*d* and 710*a*, thereby forming the loop structure. Thus, the vibration of the piezoelectric element can be amplified in a loop through the connected members until saturated, the sound pressure can be improved in the low audio frequency range. The positions at which the ends of each of the plurality of piezoelectric elements 710*a* to 710*d* are connected are the centers of the other piezoelectric elements. Thus, the characteristics of the low audio frequency range can be improved.

The elastic bodies 720*a* to 720*d* are made of the same material as that of the elastic body 120*a*. As described above, one end of the piezoelectric element 710*a* is connected to the center portion of the other piezoelectric element 710*b*, and the other end is supported by the elastic body 720*a*. In this manner, the elastic bodies 720*a* to 720*d* support the ends of the piezoelectric elements 710*a* to 710*d* on the vibration plate 130, respectively and transmit the vibrations of the piezoelectric elements 710*a* to 710*d* to the vibration plate 130. The piezoelectric elements 710*a* to 710*d* are driven in in-phase or anti-phase, and the driving method thereof is set according to the stiffness of the entire path through which the vibrations are transmitted. The sound pressure can be amplified at a specific frequency by adjusting the drive signal (anti-phase or in-phase) to change the displacement point closer to or farther away from the elastic bodies 720*a* to 720*d*.

8th Embodiment (Intermediate Connection Loop Type)

Figure 10A:
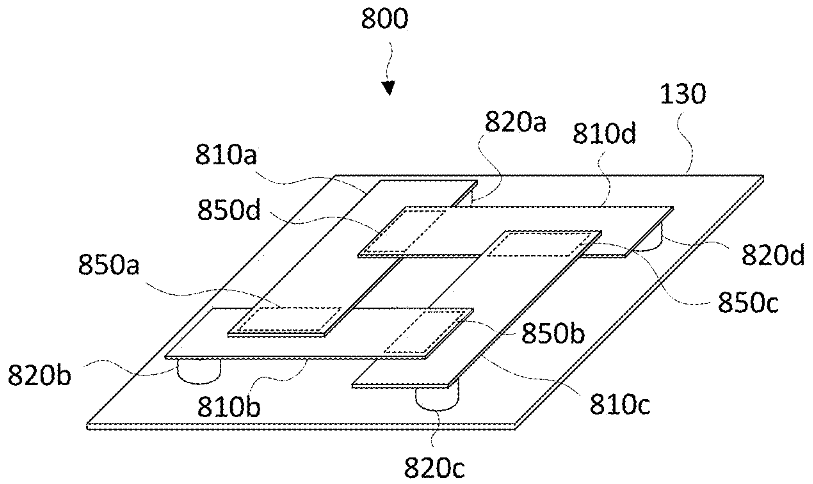
FIGS. 10A and 10B are perspective views of a SoT modules according to eighth and ninth embodiments, respectively.

In the seventh embodiment, the connecting destination of one end of the piezoelectric element is a central portion of the other piezoelectric element, but an intermediate portion between the central portion and the end portion may be the destination. FIG. 10A is a perspective view of the SoT module 800. The connection is performed by bonding one's back surface to the other's surface. A region surrounded by a dotted line in FIG. 10A is a bonding region. The SoT module 800 is configured in the same manner as the SoT module 700 except for the connecting places of the piezoelectric elements 810*a* to 810*d*. The piezoelectric elements 810*a* to 810*d* are driven in in-phase or anti-phase, and the driving method thereof is set according to the stiffness of the entire path through which the vibrations are transmitted. Thus, the characteristics of the middle audio frequency range can be improved. The sound pressure can be amplified at a specific frequency by adjusting the drive signal (anti-phase or in-phase) to change the displacement point closer to or farther away from the elastic bodies 820*a* to 820*d*.

9th Embodiment (End Connection Loop Type)

Figure 10B:
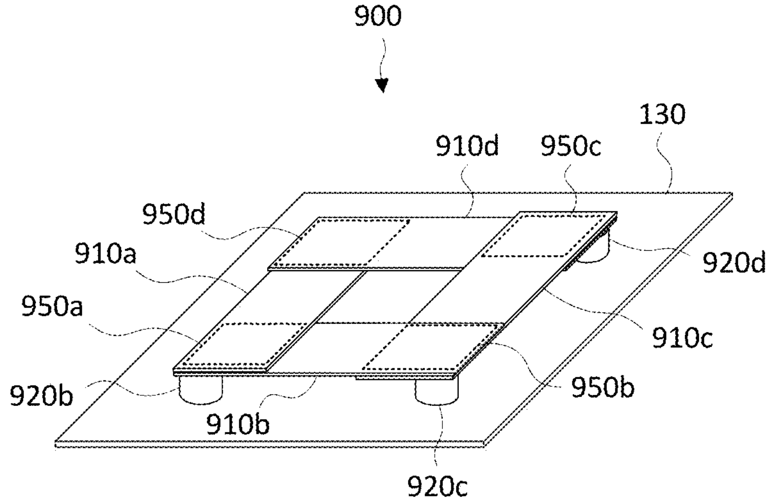

In the seventh embodiment, the connecting destination of one end of the piezoelectric element is a central portion of the other piezoelectric element, an end portion may be the destination. FIG. 10B is a perspective view of the SoT module 900. The connection is performed by bonding one's back surface to the other's surface. A region surrounded by a dotted line in FIG. 10B is a bonding region. The SoT module 900 is configured in the same manner as the SoT module 700 except for the connecting places of the piezoelectric elements 910*a* to 910*d*. The piezoelectric elements 910*a* to 910*d* are driven in in-phase or anti-phase, and the driving method thereof is set according to the stiffness of the entire path through which the vibrations are transmitted. Thus, the characteristics of the high audio frequency range can be improved. The sound pressure to be amplified at a specific frequency by adjusting the drive signal (anti-phase or in-phase) to change the displacement point closer to or farther away from the elastic bodies 920*a* to 920*d*.

Other Connection Embodiments (Crossed Type)

The piezoelectric elements may be connected so as to cross each other in the longitudinal direction to configure a piezoelectric composite. For example, the piezoelectric elements are arranged to intersect each other in the longitudinal direction and overlap the central portions. Then, the back surface of the central portion of the one piezoelectric element is bonded to the surface of the central portion of the other piezoelectric element. Thus, the displacement of the vibration plate can be amplified, and especially, the sound pressure in the middle audio frequency range from the low audio frequency range can be improved. It is preferable that the crossing is made at an orthogonal angle or an angle at which an effect equivalent thereto can be obtained.

10th Embodiment (Single Step Type)

Figure 11A:
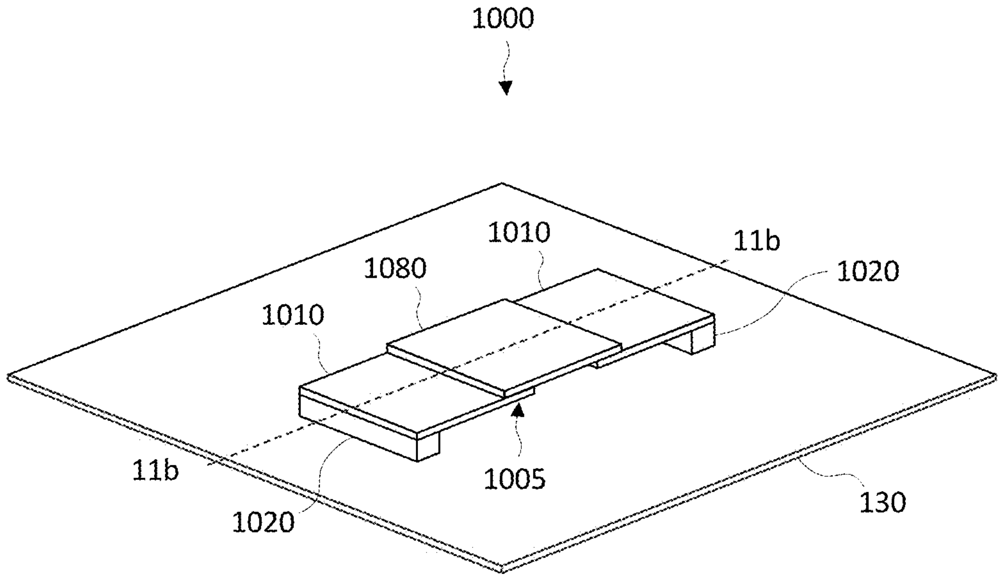
FIGS. 11A and 11B are a perspective view and a cross-sectional view showing a SoT module according to the tenth embodiment, respectively.
Figure 11B:
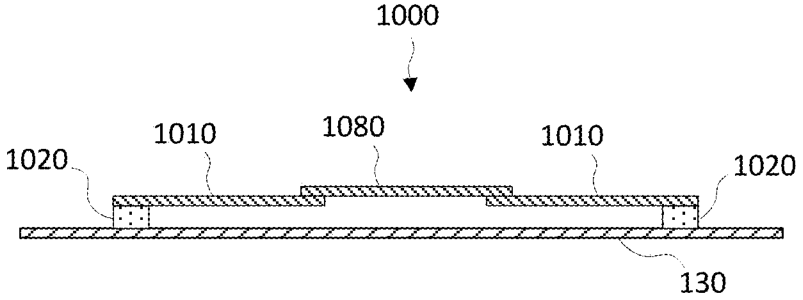

In the above embodiment, the bending-type piezoelectric element is used, but a stretching-type piezoelectric element may be used. As the stretching-type piezoelectric element, it is preferable to use a piezoelectric element obtained by stacking a piezoelectric body and an electrode in the expansion direction. FIGS. 11A and 11B are a perspective view and a cross-sectional view showing the SoT module 1000, respectively. The cross-sectional view of FIG. 11B represents a cross-sectional view 11*b* shown in FIG. 11A.

The SoT module 1000 is configured of piezoelectric elements 1010, 1080, an elastic body 1020 and a vibration plate 130. Each of the piezoelectric elements 1010 and 1080 is a stretching-type piezoelectric element. The piezoelectric elements 1010 and 1080 are preferably formed by electrodes and piezoelectric bodies which are formed of piezoelectric ceramics polarized being stacked. The piezoelectric elements 1010 and 1080 generate stretching vibration by the impression of an AC voltage.

The piezoelectric elements 1010 and 1080 are alternately arranged in a single row along the longitudinal direction, by their end portions being connected to each other, to form steps of up and down. Specifically, the back surface of the piezoelectric element 1080 is bonded to the surface of the piezoelectric element 1010 at each of the ends. The piezoelectric elements 1010 are located in a state where a portion overlaps with the piezoelectric element 1080 each other on both sides of the piezoelectric element 1080 located in the center. The piezoelectric elements 1010 and 1080 configure the symmetrical piezoelectric composite 1005.

The plurality of piezoelectric elements 1010 and 1080 may be driven by an input of a single signal (in-phase drive) or may be driven by different signals by shifting the phase for a central piezoelectric element 1080 relative to the phase of the piezoelectric elements 1010 on both sides. The displacement of the piezoelectric composite 1005 with respect to the position is represented by a curve and the curve is overlapped with the one in anti-phase, there is a position where the curves intersect. The sound pressure can be amplified at a specific frequency by adjusting the drive signal (anti-phase or in-phase) to change the displacement point closer to or farther away from the elastic bodies 1020. In this manner, the amount of displacement can be amplified through the connecting portion. When only piezoelectric element 1080 is driven in a shifting the phase, it is preferably driven in anti-phase with the piezoelectric element 1010 on both sides.

11th Embodiment (Parallel Step Type)

Figure 12A:
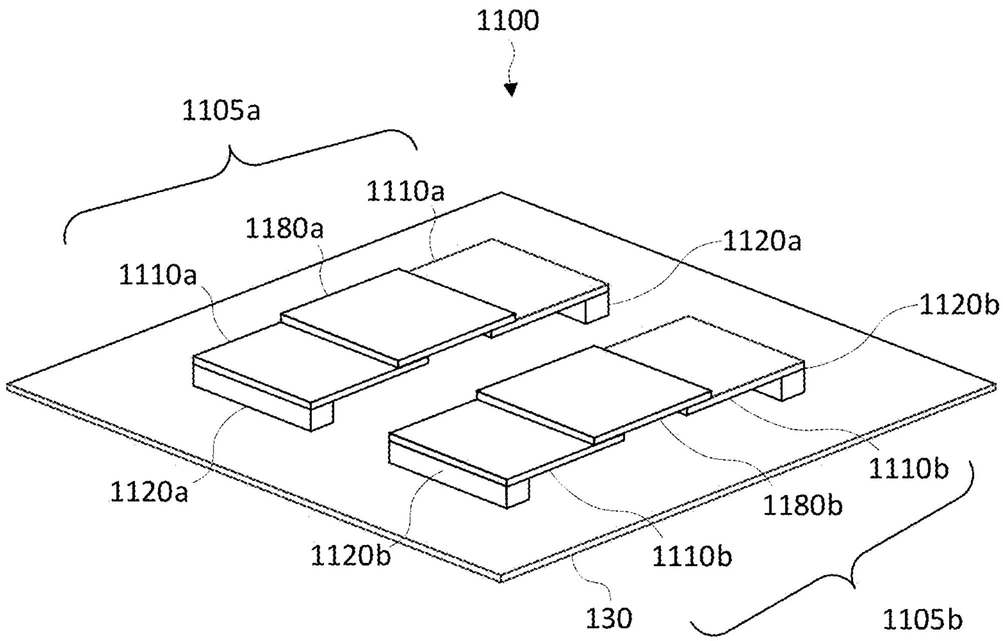
FIGS. 12A and 12B are perspective views showing SoT modules according to the eleventh embodiment and the twelfth embodiment, respectively.

FIG. 12A is a perspective view of the SoT module 1100. The SoT module 1100 comprises piezoelectric composites 1105*a* and 1105*b*, elastic bodies 1120*a* and 1120*b*, and a vibration plate 130. The piezoelectric composite 1105*a* is configured in the same manner as the piezoelectric composite 1005, has piezoelectric elements 1110*a* and 1180*a* and is formed by connecting respective ends thereof in a row. The piezoelectric composite 1105*b* is also formed by connecting ends of the piezoelectric elements 1110*b* and 1180*b* and is configured in the same manner as the piezoelectric composite 1005. The sound pressure can be amplified at a specific frequency by adjusting the drive signal (anti-phase or in-phase) to change the displacement point closer to or farther away from the elastic bodies 1120*a* and 1120*b*. Since the piezoelectric composites 1105*a* and 1105*b* are arranged in parallel, the amount of displacement can be amplified. The driving of the piezoelectric composites 1105*a* and 1105*b* can be performed in the same manner as the driving of the piezoelectric composite 1005.

12th (1) Embodiment (Crossed Step Type)

Figure 12B:
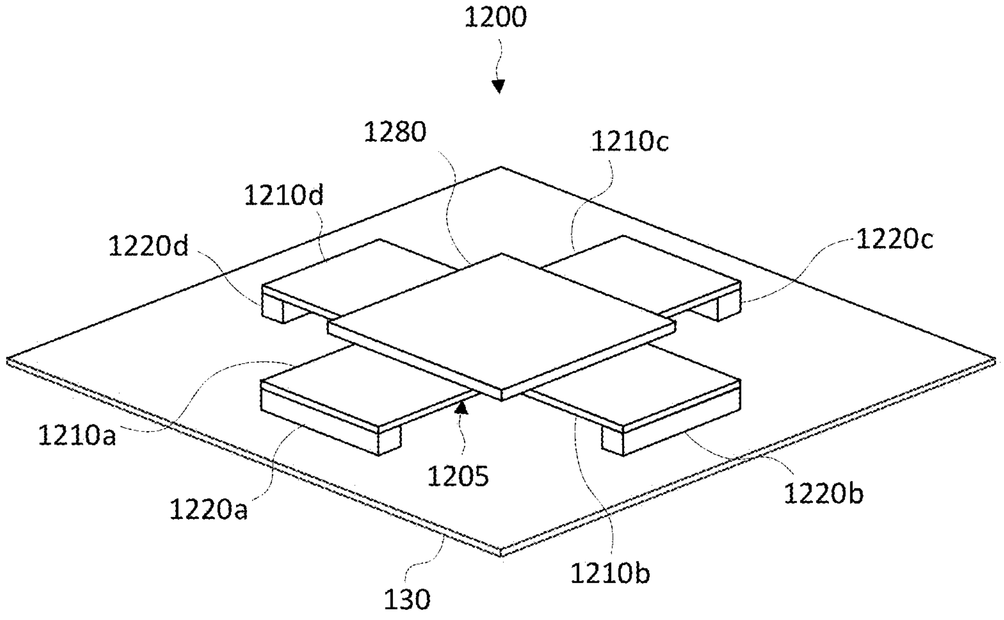

FIG. 12B is a perspective view of the SoT module 1200. The SoT module 1200 comprises a piezoelectric composite 1205, elastic bodies 1220*a* to 1220*d*, and a vibration plate 130. The piezoelectric composite 1205 comprises a central piezoelectric element 1280 and peripheral piezoelectric elements 1210*a* to 1210*d* connected at their ends to the edges of the central piezoelectric element 1280. The central piezoelectric element 1280 is larger than each of the peripheral piezoelectric elements 1210*a* to 1210*d*. The connection direction of the piezoelectric elements 1210*a*, 1280, and 1210*c* connected in one row intersects the connection direction of the piezoelectric elements 1210*b*, 1280, and 1210*d* connected in another row at perpendicular angle at the center.

The plurality of piezoelectric elements 1280 and 1210*a* to 1210*d* may be driven with a single signal input (in-phase drive) or may be driven with different signals in which the phase for the center piezoelectric element 1280 is out of the phase for the peripheral piezoelectric elements 1210*a* to 1210*d*. When only the piezoelectric element 1280 is driven in a shifted phase, it is preferably driven in anti-phase with the peripheral piezoelectric elements 1210*a* to 1210*d*. The sound pressure can be amplified at a specific frequency by adjusting the drive signal (anti-phase or in-phase) to change the displacement point closer to or farther away from the elastic bodies 1220*a* to 1220*d*.

12th (2) Embodiment (Crossed Step Type)

Figure 13A:
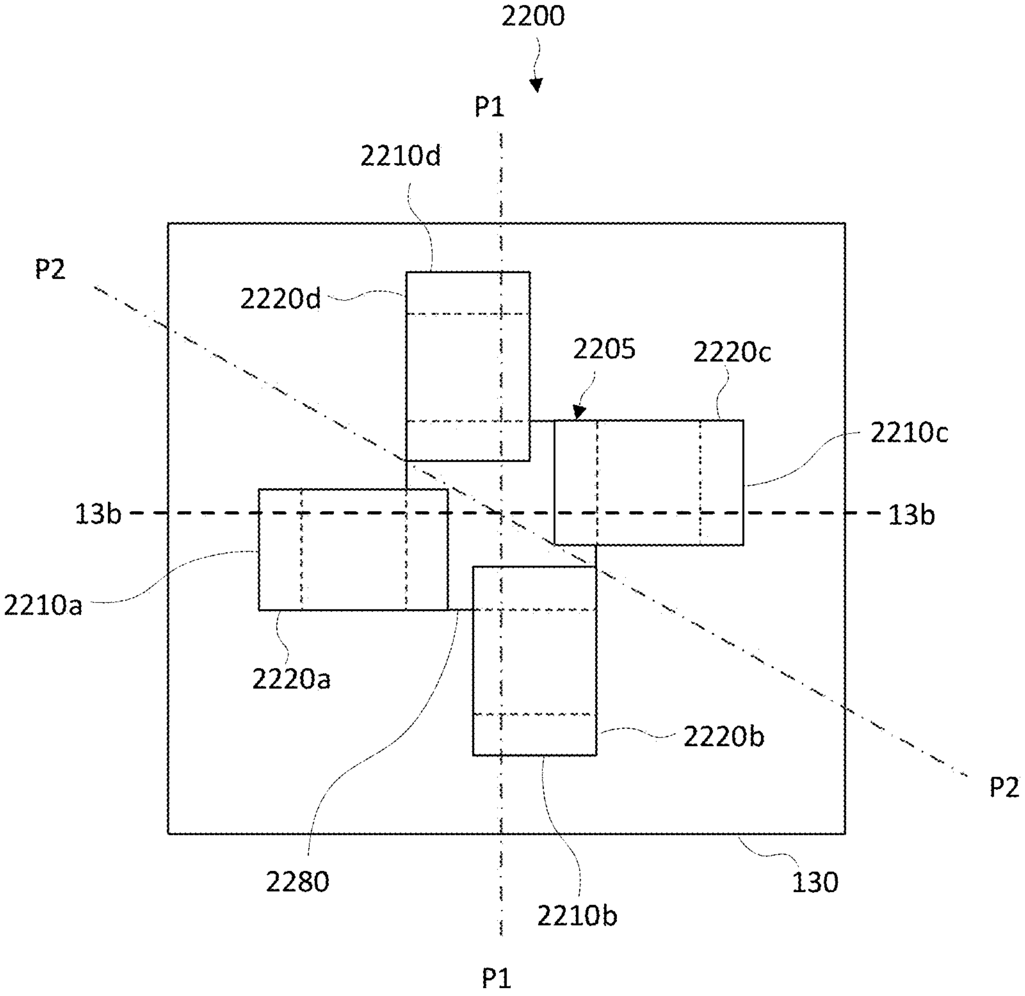
FIGS. 13A and 13B are a plan view and a cross-sectional view showing a SoT module of the twelfth embodiment, respectively.
Figure 13B:
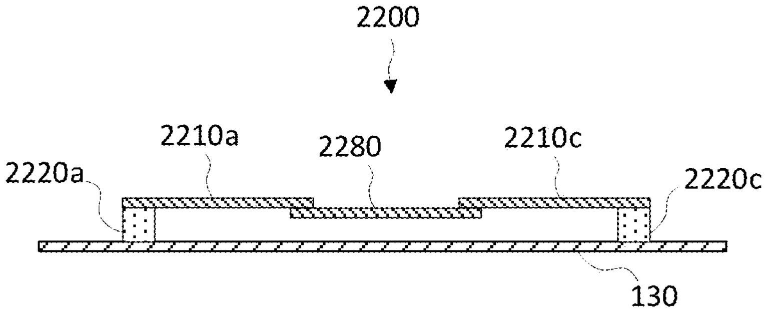

The central piezoelectric element may be connected to the vibration plate side of the peripheral piezoelectric elements. Further, each of the connecting portions may be shifted to one side from the plane passing through the center of the central piezoelectric element. FIGS. 13A and 13B are plan and cross-sectional views showing the SoT module 2200. The cross-sectional view of FIG. 13B represents a cross-section 13*b* shown in FIG. 13A.

The SoT module 2200 comprises a piezoelectric composite 2205, elastic bodies 2220*a* to 2220*d*, and a vibration plate 130. The piezoelectric composite 2205 comprises a central piezoelectric element 2280 and peripheral piezoelectric elements 2210*a*-2210*d* whose ends are connected to the edges of the central piezoelectric element 2280. The width of the central piezoelectric element 2280 is larger than the width of the peripheral piezoelectric elements 2210*a* to 2210*d*. The central piezoelectric element 2280 is connected to the vibration plate 130 side of the peripheral piezoelectric elements 2210*a* to 2210*d*. The connection direction of the piezoelectric elements 2210*a*, 2280, and 2210*c* connected in one row intersects the connection direction of the piezoelectric elements 2210*b*, 2280, and 2210*d* connected in another row at perpendicular angle at the center.

Each of the connecting portion is shifted to one side from the plane passing through the center of the central piezoelectric element 2280. For example, the connecting position of the piezoelectric element 2210*d* with respect to the plane P1 is shifted toward the piezoelectric element 2210*a*, and the connecting position of the piezoelectric element 2210*b* is shifted toward the piezoelectric element 2210*c*. In this way, the SoT module 2200 is formed in a windmill-like shape.

The plane P1 is a bisecting plane that evenly divides the piezoelectric composite 2205, and the piezoelectric composite 2205 is formed such that the shapes of both sides divided by the plane P1 are point symmetric with respect to one point on the plane P1. That is, the piezoelectric composite 2205 has a shape which looks inverted vertically and horizontally when viewed from one side to the other side divided by the plane P1. The piezoelectric composite 2205 has the same symmetry not only with respect to the plane P1 but also with respect to a bisecting plane (e.g., the plane P2) that divides evenly regardless of the angle.

The plurality of piezoelectric elements 2280 and 2210*a* to 2210*d* may be driven with a single signal input (in-phase drive) or may be driven with different signals in which the phase for the center piezoelectric element 2280 is out of the phase for the peripheral piezoelectric elements 2210*a* to 2210*d*. When only piezoelectric element 2280 is driven by shifting the phase, it is preferable to drive the piezoelectric elements 2210*a* to 2210*d* on peripheral region in anti-phase. The sound pressure to be amplified at a specific frequency by adjusting the drive signal (anti-phase or in-phase) to change the displacement point closer to or farther away from the elastic bodies 2220*a* to 2220*d*. Such adjustment is facilitated by the symmetry described above.

13th Embodiment (Single Base Plate Type)

Figure 14A:
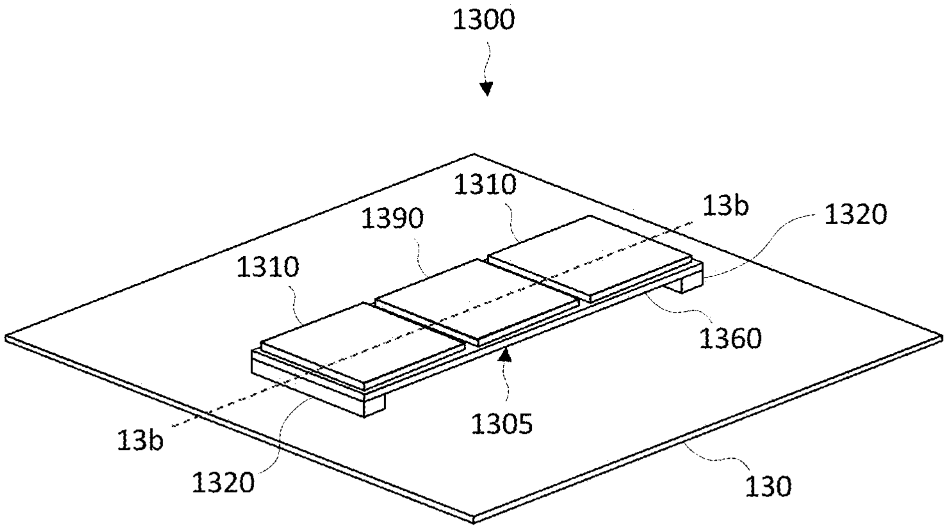
FIGS. 14A and 14B are a perspective view and a cross-sectional view showing SoT modules according to the thirteenth embodiment, respectively.
Figure 14B:
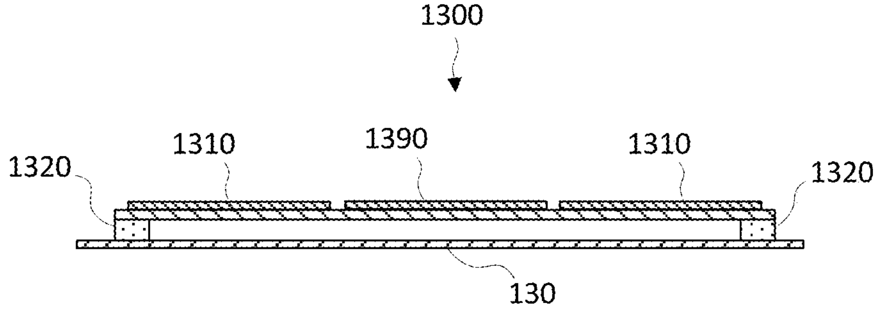

In the tenth to twelfth embodiments, the ends of the stretching-type piezoelectric elements are connected by bonding, but they may be connected via a base plate. FIGS. 14A and 14B are a perspective view and a cross-sectional view module 1300, respectively. The showing the SOT cross-sectional view of FIG. 14B represents the cross-sectional view 13*b* shown in FIG. 14A.

The SoT module 1300 comprises a piezoelectric element 1310 and 1390, elastic bodies 1320, a base plate 1360 and a vibration plate 130. Each of the piezoelectric elements 1310 and 1390 is a stretching-type piezoelectric element. The piezoelectric elements 1310 and 1390 are preferably formed by electrodes and piezoelectric bodies which are formed of piezoelectric ceramics polarized being stacked. The piezoelectric elements 1310 and 1390 generate stretching vibration by the impression of an AC voltage.

The piezoelectric elements 1310 and 1390 are provided in a row along the longitudinal direction on a rectangular base plate 1360. The piezoelectric elements 1310 and 1390 are alternately arranged at uniform intervals, and the piezoelectric composite 1305 is symmetrically formed. The piezoelectric elements 1310 and 1390 configure a symmetrical piezoelectric composite 1305.

The plurality of piezoelectric elements 1310 and 1390 may be driven by an input of a single signal (in-phase drive) or may be driven by different signals by shifting the phase for a central piezoelectric element 1390 relative to the phase of the piezoelectric elements 1310 on both sides. The displacement of the piezoelectric composite 1305 with respect to the position is represented by a curve and the curve is overlapped with the one in anti-phase, there is a position where the curves intersect. The sound pressure can be amplified at a specific frequency by adjusting the drive signal (anti-phase or in-phase) to change the displacement point closer to or farther away from the elastic bodies 1320. In this manner, the amount of displacement can be amplified through the connecting portion. The same effect can be obtained even when the elastic bodies 1320 and the vibration plate 130 are omitted and the base plate 1360 is used as the vibration plate.

14th Embodiment (Parallel Base Plate Type)

Figure 15A:
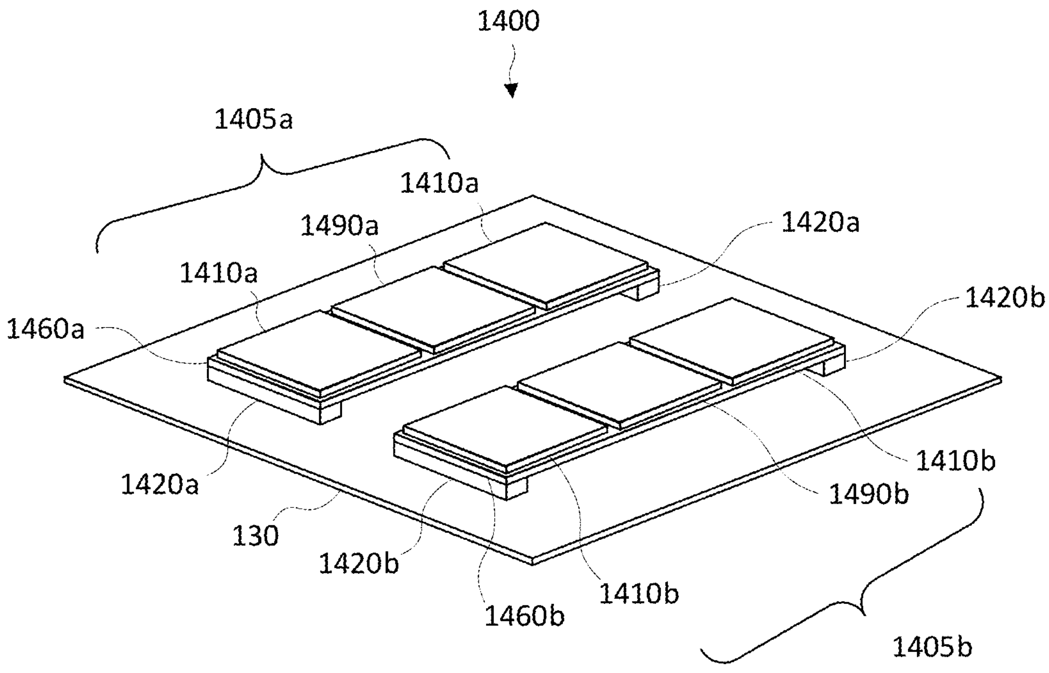
FIGS. 15A and 15B are perspective views showing the SoT modules according to fourteenth and fifteenth embodiments, respectively.

FIG. 15A is a perspective view of the SoT module 1400. The SoT module 1400 comprises piezoelectric composites 1405*a* and 1405*b*, elastic bodies 1420*a* and 1420*b*, and a vibration plate 130. The piezoelectric composite 1405*a* comprises piezoelectric elements 1410*a* and 1490*a* and a base plate 1460*a* and is configured in the same manner as the piezoelectric composite 1305. The piezoelectric composite 1405*b* also comprises piezoelectric elements 1410*b* and 1490*b* and a base plate 1460*b* and is configured in the same manner as the piezoelectric composite 1305.

The sound pressure can be amplified at a specific frequency by adjusting the drive signal (anti-phase or in-phase) to change the displacement point closer to or farther away from the elastic bodies 1320. Further, since the piezoelectric composites 1405*a* and 1405*b* are arranged in parallel, the amount of displacement can be amplified. The driving of the piezoelectric composites 1405*a* and 1405*b* can be performed in the same manner as the driving of the piezoelectric composite 1305.

15th Embodiment (Crossed Base Plate Type)

Figure 15B:
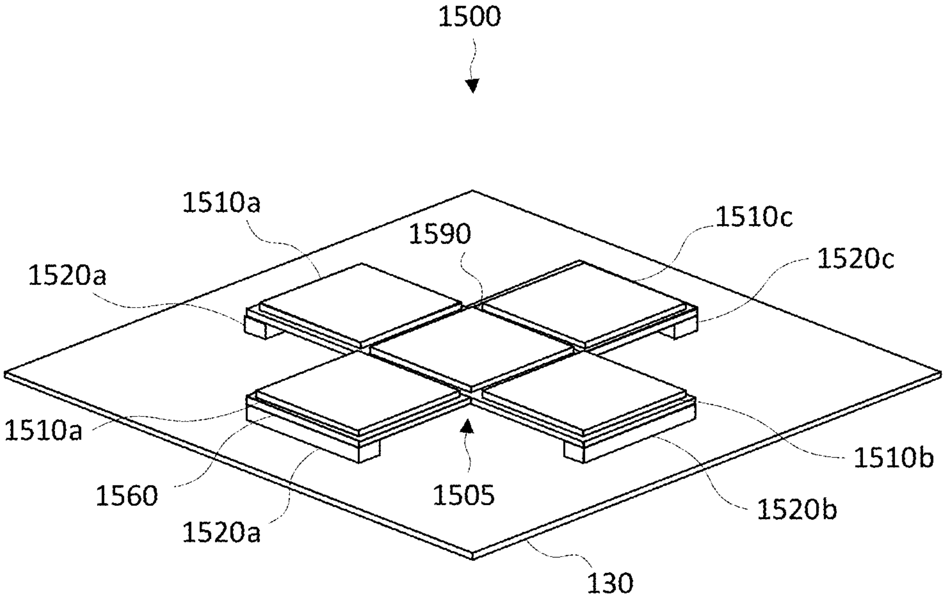

FIG. 15B is a perspective view of the SoT module 1500. The SoT module 1500 comprises a piezoelectric composite 1505, elastic bodies 1520*a* to 1520*d* and a vibration plate 130. The piezoelectric composite 1505 comprises piezoelectric elements 1510*a* to 1510*d* and 1590 and a base plate 1560. The piezoelectric elements 1510*a* to 1510*d* and 1590 are bonded onto a base plate 1560.

In the piezoelectric composite 1505, a central piezoelectric element 1590 and peripheral piezoelectric elements 1510*a* to 1510*d* are located on a cross-shaped base plate 1560. The peripheral piezoelectric elements 1510*a* to 1510*d* are all formed in the same size. In an example shown in FIG. 15B, the size of the central piezoelectric element 1590 is the same as the size of each of the peripheral piezoelectric elements 1510*a* to 1510*d* but may be different.

The plurality of piezoelectric elements 1510*a* to 1510*d* and 1590 may be driven by an input of a single signal (in-phase drive) or may be driven by different signals by shifting the phase for a central piezoelectric element 1590 relative to the phase of the peripheral piezoelectric elements 1510*a* to 1510*d*. When only the piezoelectric element 1590 is driven in a shifted phase, it is preferably driven in anti-phase with the peripheral piezoelectric elements 1510*a* to 1510*d*. The sound pressure can be amplified at a specific frequency by adjusting the drive signal (anti-phase or in-phase) to change the displacement point closer to or farther away from the elastic bodies 1520*a* to 1520*d*.

16th Embodiment (High Thermal Conductivity Structure)

Figure 16:
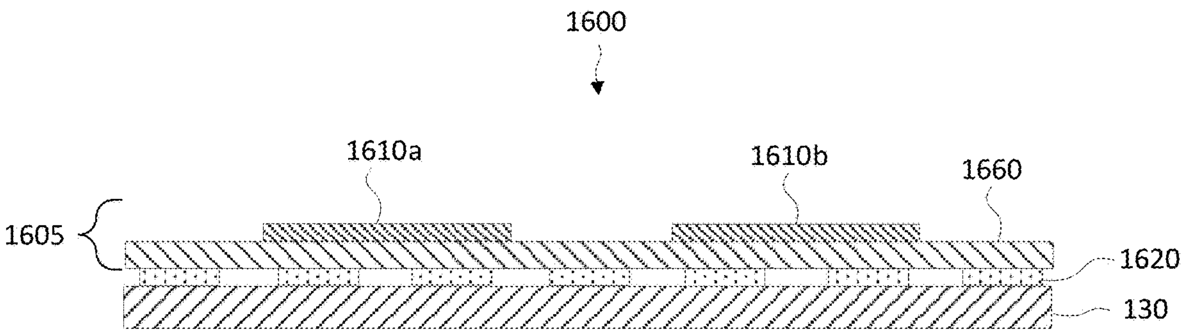
FIG. 16 is a cross-sectional view showing a SoT module according to the sixteenth embodiment.

The SoT module may be configured of a structure having a high thermal conductivity. FIG. 16 is a cross-sectional view showing the SoT module 1600.

The SoT module 1600 comprises piezoelectric elements 1610*a* and 1610*b*, a base plate 1660, elastic bodies 1620, and a vibration plate 130. The two piezoelectric elements 1610*a* and 1610*b* and the base plate 1660 bonded thereto configure a piezoelectric composite 1605. The base plate 1660 is preferably formed of metal.

Each of the piezoelectric elements 1610*a* and 1610*b* has an element structure similar to that of the piezoelectric element 110*a*. The elastic bodies 1620 supports the base plate 1660 on the vibration plate 130 in the same material and arrangement as the elastic bodies 420 and transmits the vibration of the piezoelectric composite 1605 to the vibration plate 130. Since one end of the elastic body 1620 is bonded to the base plate 1660, heat accumulated in the piezoelectric elements 1610*a* and 1610*b* can be discharged.

The elastic body 1620 is preferably formed of an elastomer. Further, the elastic body preferably has a thermal coefficient of $1\times10^{-4}$ $cal\cdot s^{-1}cm^{-2}$ or more. Thus, the elastic body 1620 can discharge heat with high thermal conductivity.

17th Embodiment (Partition Type Partition)

The SoT module of the sixteenth embodiment is configured of piezoelectric elements, a base plate, elastic bodies and a vibration plate, but it may further have a partition. FIG.

Figure 17A:
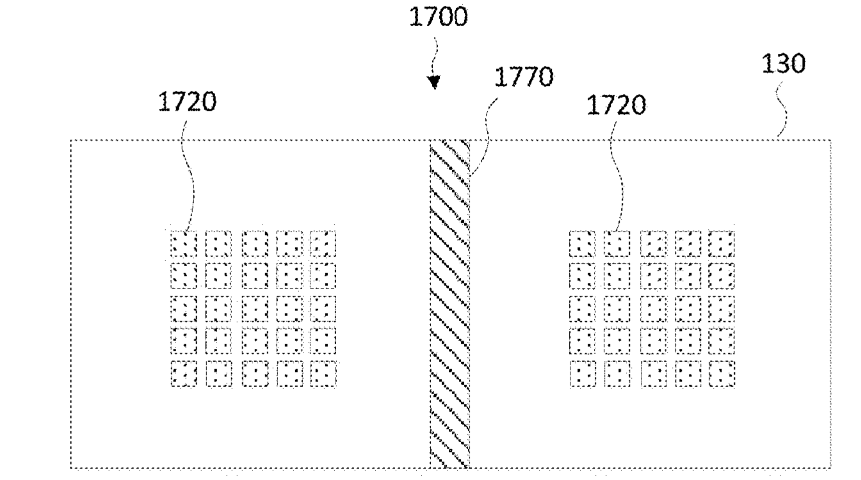
FIGS. 17A and 17C are plan views showing SoT modules according to the seventeenth to nineteenth embodiments, respectively.

17A is a cross-sectional view showing the SoT module 1700. FIG. 17A shows a cross-section of the elastic bodies 1720 cut in a plane parallel to the vibration plate 130.

The SoT module 1700 comprises a piezoelectric element, an elastic body 1720, a vibration plate 130 and a partition 1770. The piezoelectric element has the same element structure as the piezoelectric element 110. The piezoelectric elements are preferably connected to each other. The plurality of piezoelectric elements are separated to the left and right to form the piezoelectric composites.

The elastic body 1720 has one end bonded to the piezoelectric composite and the other end bonded to the vibration plate 130, and an assembly of the elastic bodies 1720 is formed for each of the two piezoelectric composites. Between them, the partition 1770 is provided. By the partition 1770, the acoustic interference in the left and right speakers can be suppressed.

18th Embodiment (Enclosed Partition)

Figure 17B:
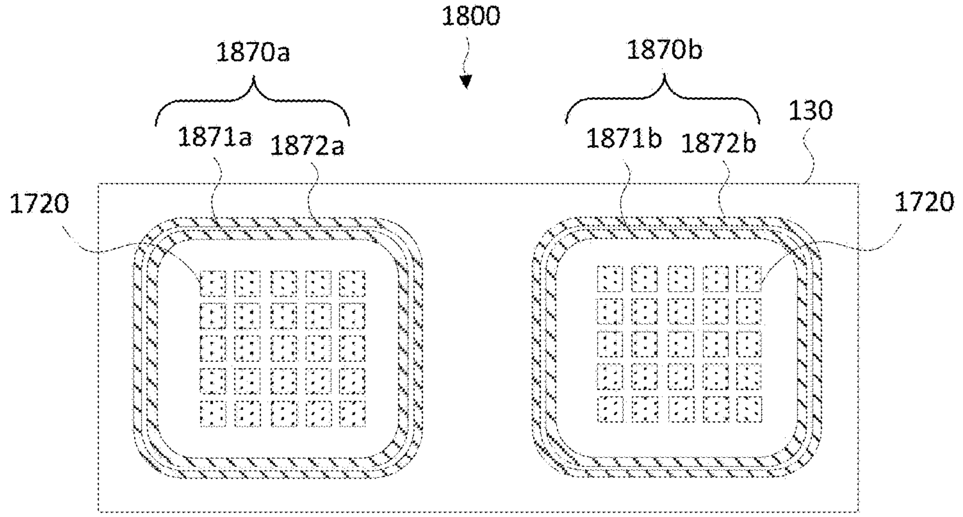

The partition may have a structure surrounding the assembly of the elastic bodies. FIG. 17B is a cross-sectional view showing the SoT module 1800. FIG. 17B shows a cross section when the elastic bodies 1720 are cut in a plane parallel to the vibration plate 130.

The SoT module 1800 is configured in the same manner as the SoT module 1700 except that partitions 1870*a* and 1870*b* are provided instead of the partition 1770.

The partitions 1870*a* and 1870*b* surround assemblies of left and right elastic bodies 1720, respectively. The partitions 1870*a* and 1870*b* are configured of inner partitions 1871*a* and 1871*b* and outer partitions 1872*a* and 1872*b*, respectively. Since the partitions 1870*a* and 1870*b* have double structures surrounding the elastic bodies 1720, the sound is hardly transmitted to the outside of each of the partitions. Thus, it is possible to effectively suppress the acoustic interference occurring inside the left and right respective speakers.

19th Embodiment (Air-Cooled Partition)

Figure 17C:
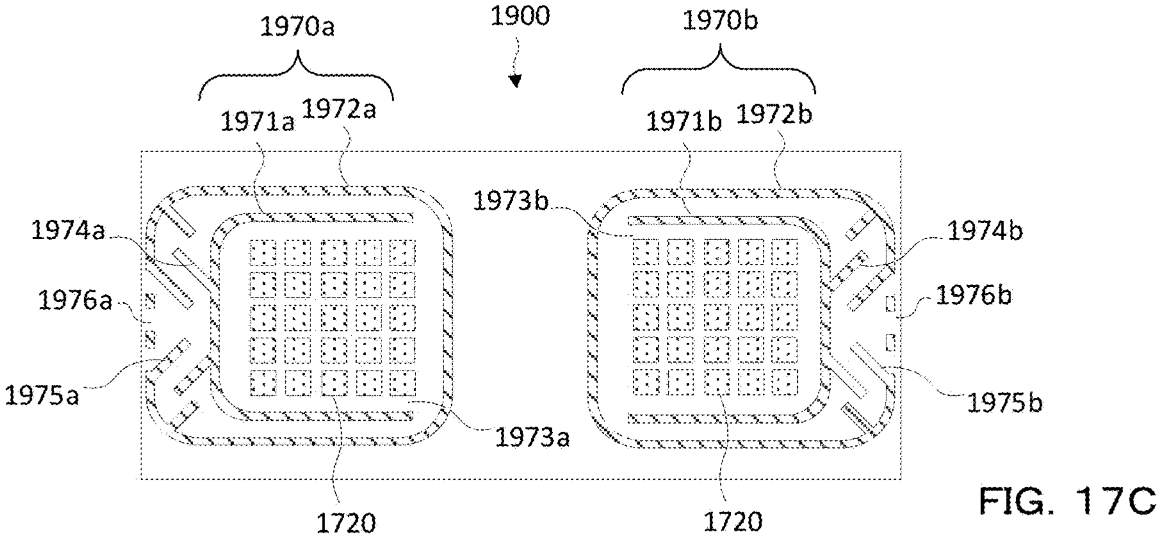

The partition may have an air flow path. FIG. 17C is a plan view showing the SoT module 1900. FIG. 17C shows a cross section when the elastic bodies 1720 are cut in a plane parallel to the vibration plate 130.

The SoT module 1900 is configured in the same manner as the SoT module 1800 except that the partitions 1870*a* and 1870*b* are replaced with partitions 1970*a* and 1970*b*.

The partitions 1970*a* and 1970*b* are provided so as to surround respective assemblies of the left and right elastic bodies 1720. The partitions 1970*a* and 1970*b* are configured of inner partitions 1971*a* and 1971*b* and outer partitions 1972*a* and 1972*b*, respectively. The partitions 1970*a* and 1970*b* have double structures surrounding the elastic bodies 1720.

The inner partitions 1971*a* and 1971*b* have openings 1973*a* and 1973*b* and walls 1974*a* and 1974*b*, respectively. The outer partitions 1972*a* and 1972*b* also have walls 1975*a* and 1975*b* and openings 1976*a* and 1976*b*, respectively. Thus, a continuous air flow path is formed from the elastic body 1720 to the outside of the partitions 1970*a* and 1970*b*. As a result, the SoT module 1900 can improve the cooling efficiency while suppressing acoustic interference.

[Applied Products]

The SoT module configured as described above can be used in various applications. The applications can be roughly classified into acoustic and noise cancellation. Noise cancellation is a technique that uses sounds with anti-phases and is particularly effective for removing regular noise such as motor sounds. Though it is said to be difficult to cancel the noise of 1 kHz or less, the SoT module can also sufficiently work for the noise cancellation of 1 kHz or less.

(Automobiles)

If there is a plate which functions as a vibration plate, the SoT module can be configured by installing the piezoelectric elements and the elastic bodies there. For example, parts of plastic panels of automobile doors, ceilings, trunks, headrests, and dashboards can be utilized as vibration plates to configure the SoT modules.

In the case that the internal space is limited as in an automobile, sounds generated by placing the SoT module at various positions are audible to the listener as spatially balanced sounds rather than sounds spreading from one position. For example, sound can be generated at a small volume from the back portion of the front seat or behind the seat.

Not only for such acoustic applications, but also the SoT module can be used for a noise canceller in an automobile. Specifically, the SoT module is formed under the sheet, and the noise can be canceled with the sound in anti-phase to the engine sound.

If the above-described configuration would be realized with a speaker using a coil, it is difficult to secure the space in the automobile. Further, in terms of securing the power supply and reducing the weight, it is difficult to use a speaker using a coil. In contrast, as long as the SoT module using the piezoelectric element, a limited space, allowable weight and power source can be sufficiently utilized.

(Electrical Products)

Electrical products are suitable for applications of SoT modules because power supply can be easily secured, and the housing can be utilized as a vibration plate. For example, the SoT module can be used for noise cancellation of a washing machine. In this case, the SoT module can be installed in the washing machine itself or can be installed in attachments of the washing machine. For example, it is preferable to install the SoT module on the pan of the washing machine as a noise canceller to form a mechanism that does not transmit sound. The sound leaked from the washing machine is a low sound of 1 kHz or less passing through the soundproofing material, and this sound can not be cancelled by the usual piezoelectric module, but it can be cancelled by the SoT module.

(CSO)

Typical applications of the SoT module comprise Cinematic Sound OLDE (CSO). CSO is a technique in which acoustic techniques are added to the self-emitting OLED to match the sound positions of the screens with the actual sound generating positions. With using an OLED panel as a vibration plate, the user can hear sound according to the image by directly transmitting sound from OLED screen, rather than from a separate speaker installed in the TV. That is, the user can hear the sound of talking with each other from the mouth of the performers of movies and dramas and can also hear the sound of the rain falling from the sky touching the ground from the position where the rain hits the ground on the actual screen. In this way, the user gets more immersion feeling. This application is not limited to TV, and the SoT module can be similarly applied to signage.

(Furniture, Architectural Components)

The SoT module is also applicable to furniture and architectural components. For example, the piezoelectric elements and the elastic bodies can be installed in the box-shaped drawer used in the rack frame are assembled to form a SoT module. In this way, the inside of the desk drawer can be sounded, and the inside of the box can be used as a speaker. Even if the drawer is filled with objects, a desired sound can be generated.

Piezoelectric elements and elastic bodies can also be installed on the iron plates behind LED projectors installed on roads, and iron plates can be used with vibration plates to configure SoT modules. An audible alarm can be generated directly from the LED projector, for example. It is also possible to configure a SoT module using a ceiling, wall or partition as a vibration plate. In that case, it can be used for both acoustic and noise cancellation. Such a configuration is also possible with a speaker by a coil in terms of sound pressure in the low audio frequency range, it is impossible to secure the space in the building. Further, a loudspeaker with a coil requires a strong power source, which may be subject to legal restrictions. SoT modules can be installed in small spaces, and they can be retrofitted by domestic power source for general use.

EXAMPLE

Formula (1) is a mathematical expression representing a natural frequency fs of a piezoelectric module. M and S represent the mass and stiffness of the piezoelectric module, respectively. In the case of a plate type piezoelectric module, the overall stiffness value mainly depends on the stiffness of the elastic body.

[Formula 1]

$$f_s = \frac{1}{2\pi} \times \left[\frac{S}{M}\right]^{1/2} \tag{1}$$

Therefore, by reducing the stiffness of the elastic body, the natural frequency of the entire system can be reduced. Further, since the stiffness of the entire system is also dependent on the tensile strength of the vibration plate, it is also possible to improve the sound pressure of low audio frequency sound according to the selection of the material of the vibration plate.

However, on the other hand, the transmissibility is lowered by the weight of the vibration plate, and there is also a possibility that the sound pressure characteristics deteriorate. In order to solve this problem, if the bonding strength between the piezoelectric composite and the vibration plate is increased to increase the transfer coefficient, the piezoelectric composite must receive all the weight of the panel, and the amplitude cannot be maintained. In consideration of such circumstances, sound pressure can be improved not only by adding an elastic body to the vibration path but also by adjusting the damping ratio of the vibration transmission path.

Example 1

Figure 18A:
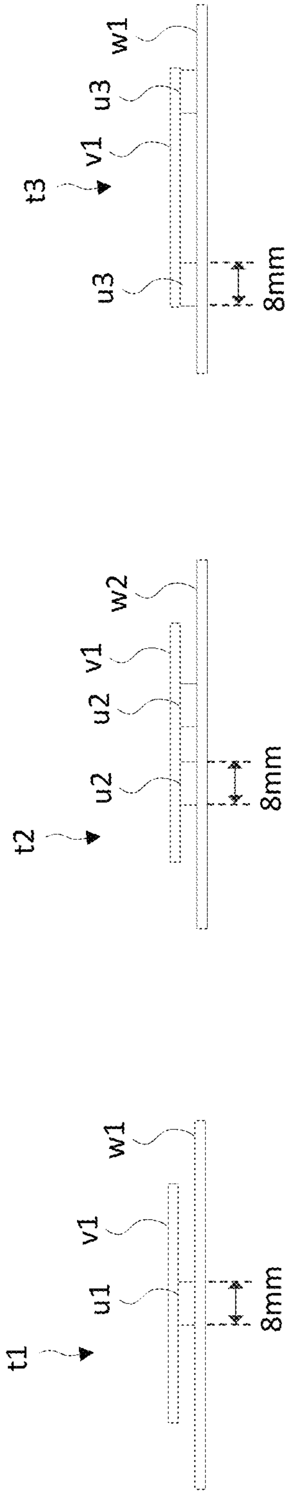
FIGS. 18A and 18B are a side view showing piezoelectric modules for testing in which the positions of the elastic bodies differ from each other and a graph showing the frequency characteristics of their sound pressure, respectively.

Piezoelectric modules for testing were prepared by varying the arrangement of elastic bodies, and the frequency characteristics of sound pressure were measured. FIG. 18A is a side view showing the piezoelectric modules t1 to t3 for testing in which the positions of the elastic bodies differ from each other. As shown in FIG. 18A, the piezoelectric module t1 for testing is configured of the piezoelectric element v1, the elastic body u1, and the vibration plate w1. The piezoelectric element v1 is a bending-type piezoelectric element using PZT. The elastic body u1 has a length of 8 mm in the longitudinal direction of the piezoelectric element v1 and is formed of urethane, one surface is bonded to the central portion in the longitudinal direction of the piezoelectric element v1. The vibration plate w1 is a OLED panel and is bonded to the other surface of the elastic body u1.

The piezoelectric module t2 for testing is configured of the piezoelectric element v1, the elastic bodies u2, the vibration plate w2. The two elastic bodies u2 respectively have the length of 8 mm in the longitudinal direction of the piezoelectric element v1 and is formed of urethane in the same manner as the elastic body u1, but they are respectively located at intermediate positions between the central portion and both end portions in the longitudinal direction of the element v1.

The piezoelectric module t3 for testing is configured of the piezoelectric element v1, the elastic bodies u3, the vibration plate w1. The two elastic bodies u3 respectively have the length of 8 mm in the longitudinal direction of the piezoelectric element v1 and is formed of urethane in the same manner as the elastic body u1, but they are respectively located at both ends in the longitudinal direction of the piezoelectric element v1.

Figure 18B:
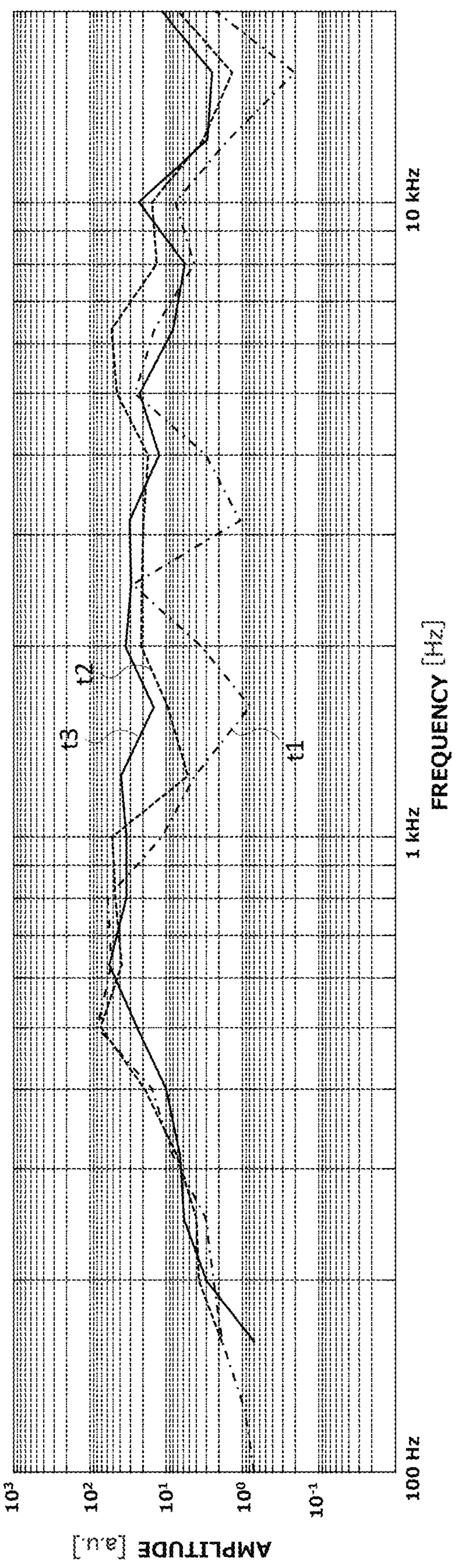

FIG. 18B is a graph showing the frequency characteristics of the sound pressure of the piezoelectric modules t1 to t3 for testing. As shown in FIG. 18B, the peak dip in the middle audio frequency region occurring with the piezoelectric modules t1 and t2 for testing does not occur with the piezoelectric module t1 for testing.

Example 2

Figure 19A:
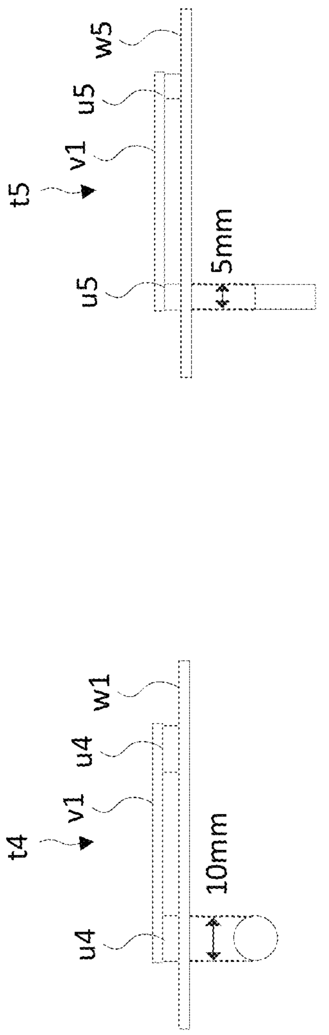
FIGS. 19A and 19B are a side view showing piezoelectric modules for testing in which the shapes of the elastic bodies differ and a graph showing the frequency characteristics of their sound pressure, respectively.

The piezoelectric modules for testing were prepared by varying the shapes of the elastic bodies, and the frequency characteristics of sound pressure were measured. FIG. 19A is a side view showing the piezoelectric modules t4 and t5 for testing in which the shapes of the elastic bodies differ.

As shown in FIG. 19A, the piezoelectric module t4 for testing is configured of the piezoelectric element v1, the elastic bodies u4, and the vibration plate w1. Each of the two elastic bodies u4 is formed of urethane in a cylindrical shape having a diameter of 10 mm at both ends in the longitudinal direction of the piezoelectric element v1. Further, the piezoelectric module t5 for testing is configured of the piezoelectric element v1, the elastic bodies u5, the vibration plate w5. Each of the two elastic body u5 is formed of urethane in a rectangular body shape having a length of 5 mm at both ends in the longitudinal direction of the piezoelectric element v1.

Figure 19B:
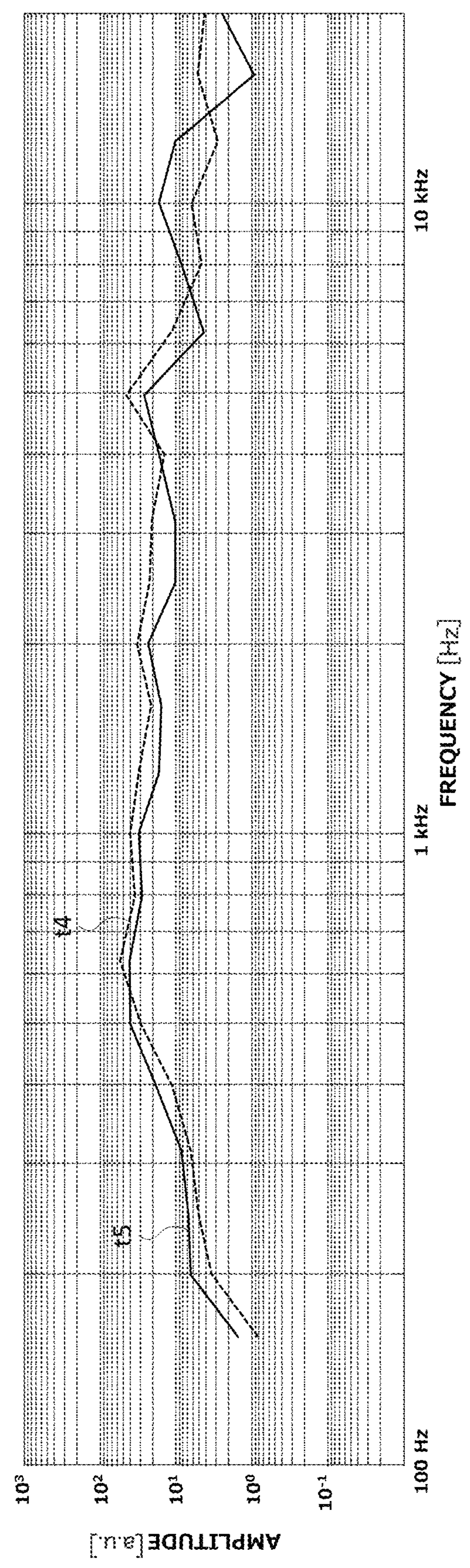

FIG. 19B is a graph showing the frequency characteristics of the sound pressure of the piezoelectric modules t4 and t5 for testing. As shown in FIG. 19B, the sound pressure of the piezoelectric module t5 for testing is slightly large in the low audio frequency range, the sound pressure of the piezoelectric module t4 for testing is large in the middle audio frequency range. However, there was no significant difference in the frequency characteristics of the sound pressure depending on the shape of the elastic bodies.

Example 3

Figure 20:
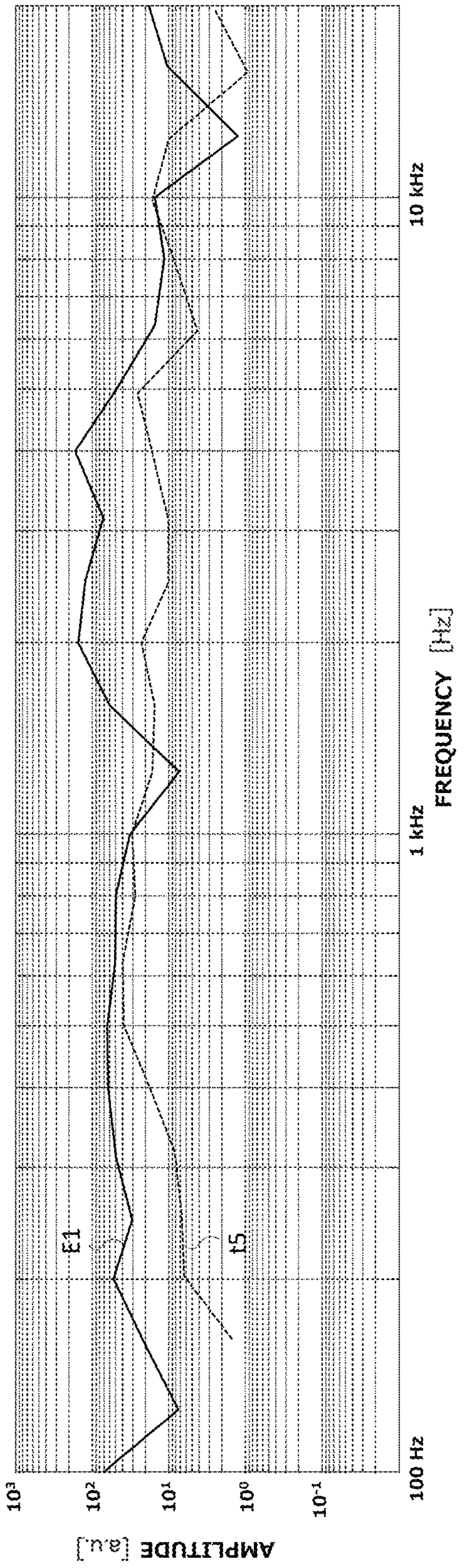
FIG. 20 is graph a showing the frequency characteristics of the sound pressure of the SoT modules for the respective embodiment.

The frequency characteristics of the sound pressure was measured for SoT module 100 of the first embodiment (example E1 (parallel type)). FIG. 20 is a graph showing the frequency characteristics of the sound pressure of the piezoelectric module of example E1 and the piezoelectric module t5. As shown in FIG. 20, although the sound pressure drops around 100 Hz, the sound pressure is obtained in the low and middle audio frequency range from 200 Hz to 1 kHz equivalent to that in the high audio frequency range. Note that a drop in sound pressure is observed in the vicinity of 1.5 kHz.

Example 4

Figure 21:
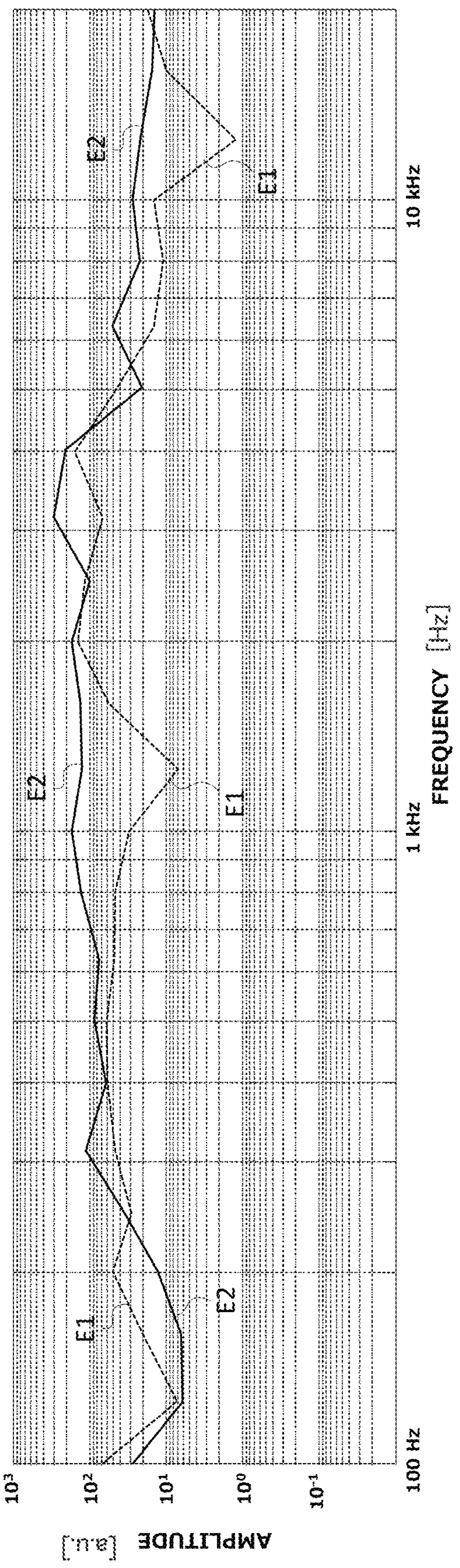
FIG. 21 is a graph showing the frequency characteristics of the sound pressure of the SOT modules for the respective embodiment.

The SoT module 200 of the second embodiment (example E2 (end connection type)) was prepared to measure the frequency characteristics of the sound pressure. FIG. 21 is a graph showing the frequency characteristics of the sound pressure of the SoT modules for each of the examples E1 and E2. In the example E1, there is a region in which the sound pressure is small in the low audio frequency range of 100 Hz to 400 Hz. However, in the region of the middle audio frequency range of around 1 kHz, the example E2 has the flatter characteristic of sound pressure than the example E1, and the drop in sound pressure of the example E1 does not exist in the example E2. Further, the flat characteristics are obtained in the example E2 even in the high audio frequency range of 10 kHz or more.

Example 5

Figure 22:
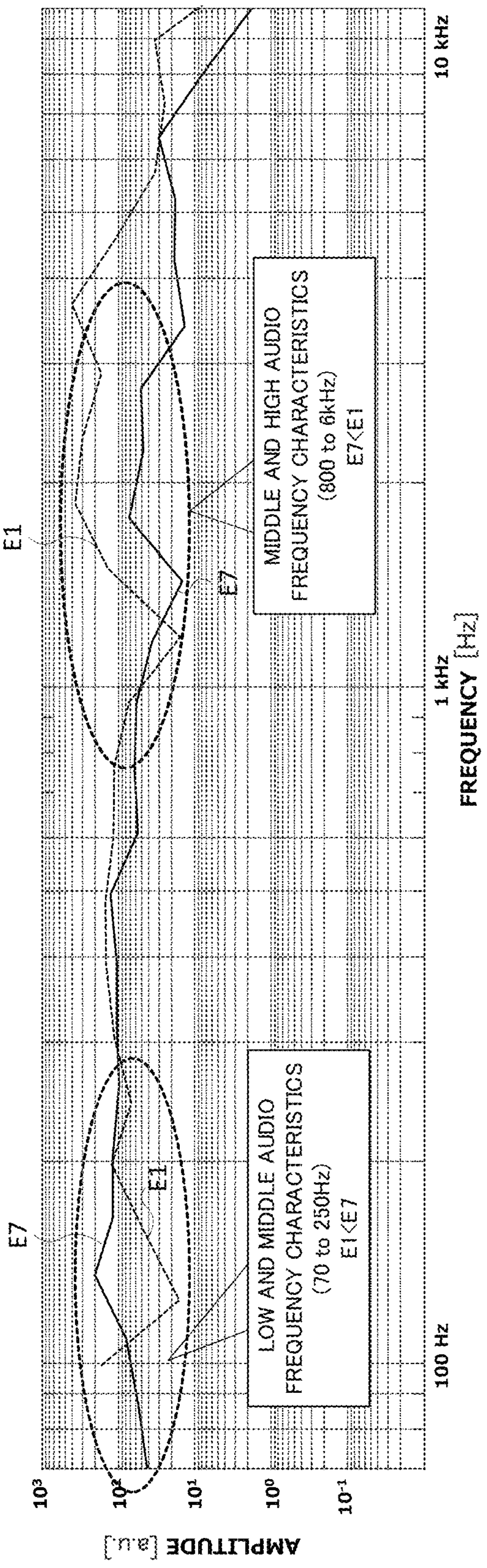
FIG. 22 is a graph showing the frequency characteristics of the sound pressure of the SoT modules for the respective embodiment.

The SoT module 700 of the seventh embodiment (example E7 (central connection loop type)) was prepared to measure the frequency characteristics of the sound pressure. FIG. 22 is a graph showing the frequency characteristics of the sound pressure of the SoT module for each of the examples E1 and E7. As shown in FIG. 22, in the low audio frequency range, the example E7 provides a larger and more flat sound pressure than the example E1. In the middle and high audio frequency range, the example E1 provides a larger and more flat sound pressure than the example E7. It has been found that the example E7 (a central connection loop type) greatly improves the sound pressure in the low audio frequency range.

Example 6

Figure 23:
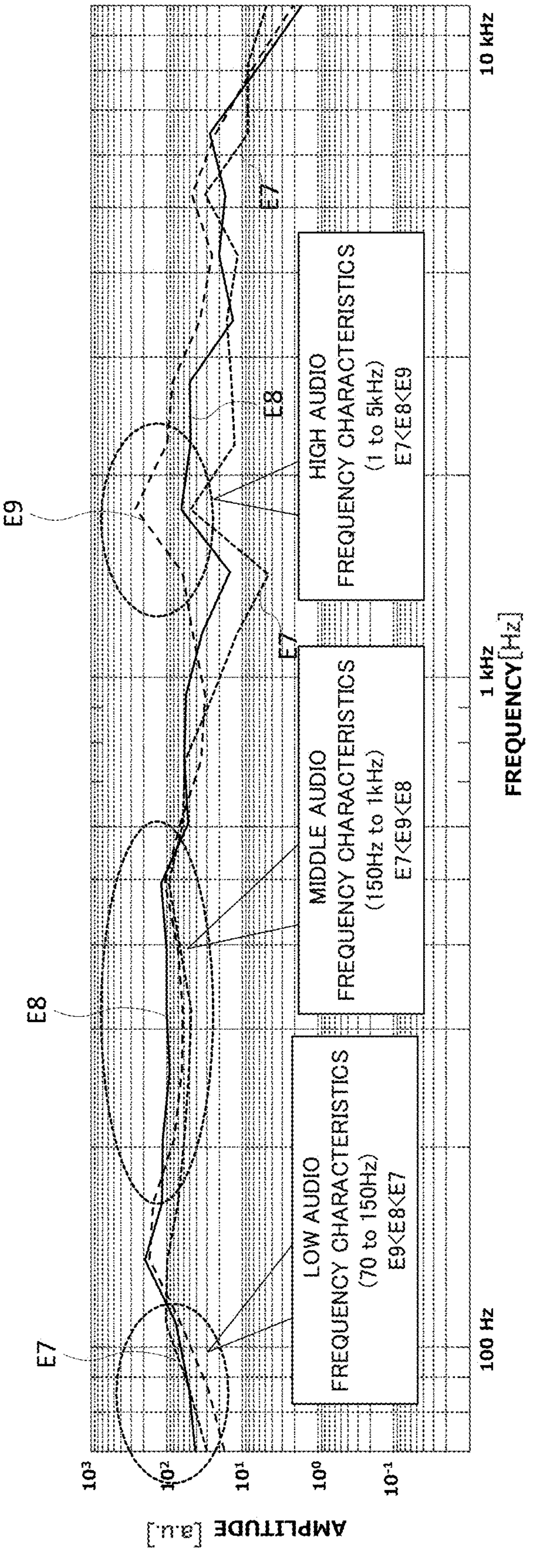
FIG. 23 is a graph showing the frequency characteristics of the sound pressure of the SoT modules for the respective embodiment.

The SoT module 700 of the seventh embodiment (example E7 (central connection loop type)), the SoT module 800 of the eighth embodiment (example E8 (intermediate connection loop type)), and the SoT module 900 of the ninth embodiment (example E9 (end connection loop type)) were prepared, and the frequency characteristics of the respective sound pressures were measured. FIG. 23 is a graph showing the frequency characteristics of the sound pressure of the SoT module for each of the examples E7-E9. As shown in FIG. 23, in the low audio frequency range, the largest sound pressure was obtained in the example E7. In the middle audio frequency region, the largest sound pressure was obtained in the example E8. In the high audio frequency range, the largest sound pressure was obtained in the example E9. Thus, the SOT modules 700, 800, and 900 have been found to be suitable for applications in low, middle and high audio frequency range, respectively.

Example 7

Figure 24:
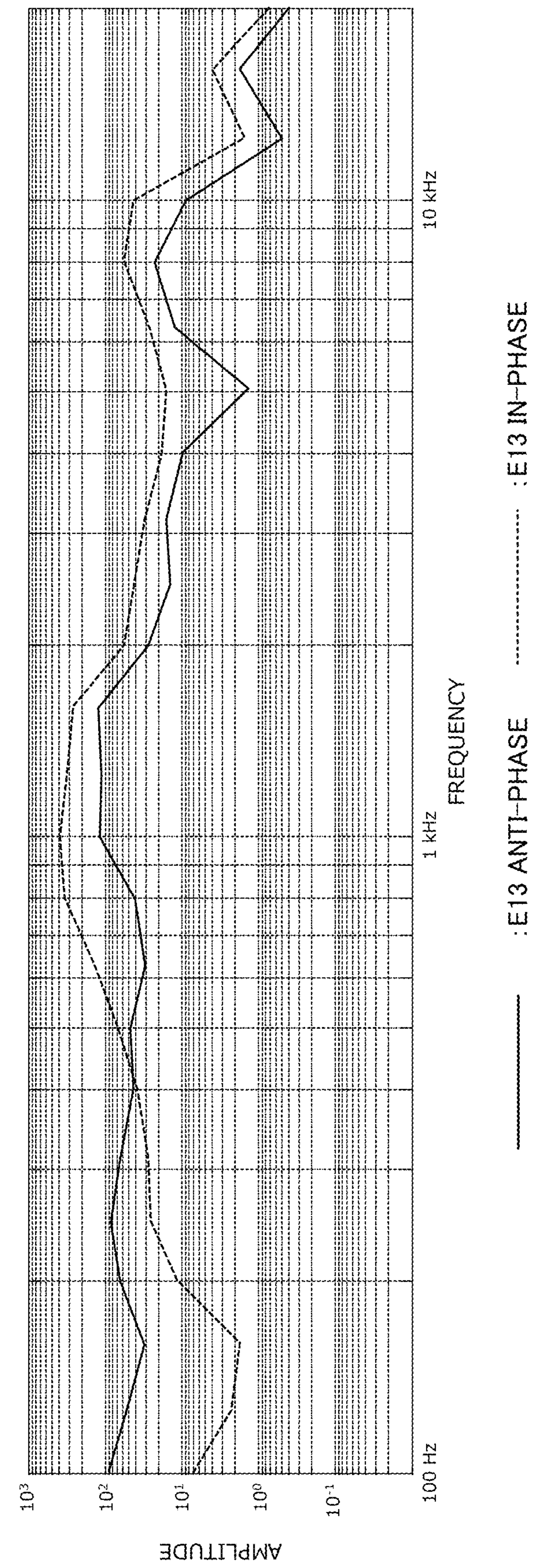
FIG. 24 is a graph showing the frequency characteristics of the sound pressure of a SoT module which is driven in-phase and anti-phase for the example E13.
Figure 25:
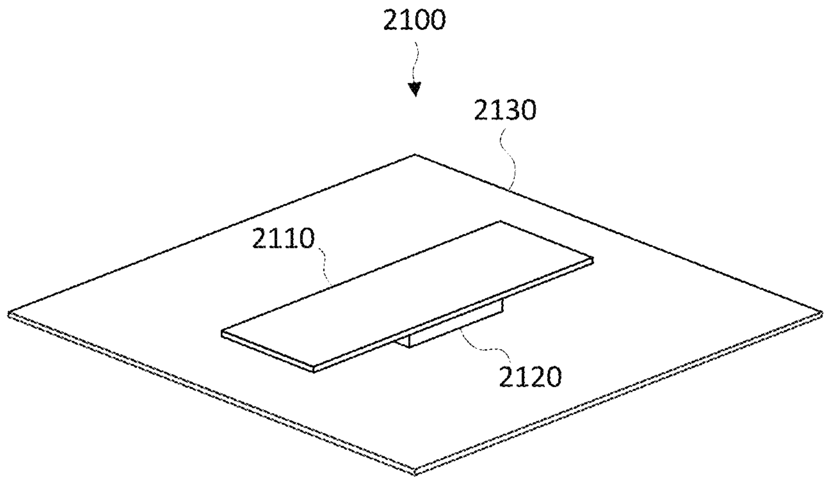
FIG. 25 is a perspective view showing a conventional piezoelectric module.
Figure 26:
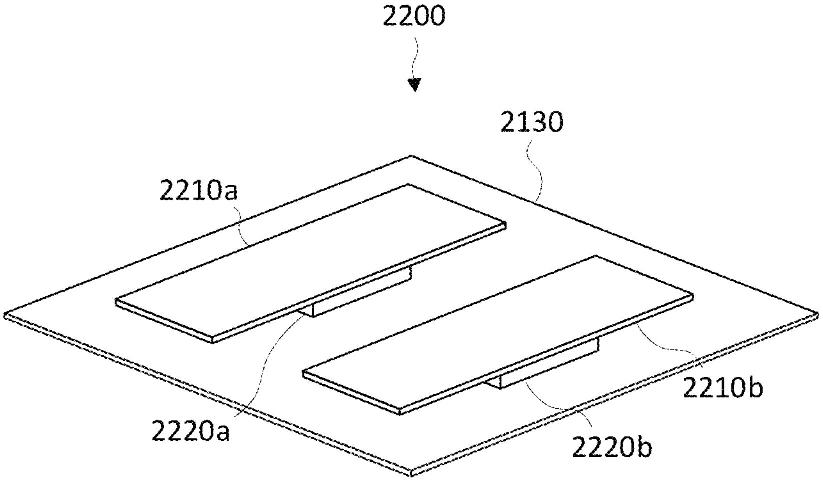
FIG. 26 is a perspective view showing a conventional piezoelectric module.

The SoT module 1300 of the thirteenth embodiment (example E13 (single base plate type)) was prepared, the central piezoelectric element 1390 was driven in in-phase drive or anti-phase to the piezoelectric elements 1310 on both sides of the center, and frequency characteristics of the sound pressure were measured. FIG. 24 is a graph showing the frequency characteristics of the sound pressure of the SoT module when driven in-phase and anti-phase for the example E13. As shown in FIG. 24, the sound pressure in the low audio frequency range is improved in the anti-phase drive, and the sound pressure in the middle and high audio frequency range is improved in the in-phase drive.

REFERENCE SIGNS LIST

100 SoT module (1st embodiment)
110 piezoelectric element
110*a* and 110*b* piezoelectric element
P1 power supply
111, 112 piezoelectric body
113, 114 electrode
115 shim plate
120*a*, 120*b* elastic body
130 vibration plate
200 SoT module (2nd embodiment)
205 piezoelectric composite
210*a*, 210*b* piezoelectric element
220*a*, 220*b* elastic body
240*a*, 240*b* connecting member
300, 400, 500 SoT modules (3rd-5th embodiment)
320, 420, 520 elastic body
600 SoT module (6th embodiment)
605 piezoelectric composite
610*a*-610*c* piezoelectric element
620*a*, 620*b* elastic body
700 SoT module (7th embodiment)
705 piezoelectric composite
710*a*-710*d* piezoelectric element
720*a*-720*d* elastic body
800 SoT module (8th embodiment)
810*a*-810*d* piezoelectric element
820*a*-820*d* elastic body
900 SoT module (9th embodiment)
910*a*-910*d* piezoelectric element
920*a*-920*d* elastic body
1000 SoT module
1005 piezoelectric composite
1010, 1080 piezoelectric element
1020 elastic body
1100 SoT module
1105*a*, 1105*b* piezoelectric composite
1110*a*, 1180*a*, 1110*b*, 1180*b* piezoelectric element
1120*a*, 1120*b* elastic body
1200 SoT module
1205 piezoelectric composite
1210*a*-1210*d*, 1280 piezoelectric element
1220*a*-1220*d* elastic body
1300 SoT module
1305 piezoelectric composite
1310, 1390 piezoelectric element
1320 elastic body
1360 base plate
1400 SoT module
1405*a*, 1405*b* piezoelectric composite
1410*a*, 1490*a*, 1410*b*, 1490*b* piezoelectric element
1420*a*, 1420*b* elastic body
1460*a*, 1460*b* base plate
1500 SoT module
1505 piezoelectric composite
1510*a*-1510*d*, 1590 piezoelectric element
1520*a*-1520*d* elastic body
1560 base plate
1600 SoT module (16th embodiment)
1605 piezoelectric composite
1610*a*, 1610*b* piezoelectric element

1620 elastic body
1660 base plate
1700 SoT module (17th embodiment)
1720 elastic body
1770 partition
1800 SoT module (18th embodiment)
1870*a*, 1870*b* partition (entire)
1871 *a*, 1871*b* inner partition
1872*a*, 1872*b* outer partition
1900 SoT module (19th embodiment)
1970*a*, 1970*b* partition
1971*a*, 1971*b* inner partition (entire)
1972*a*, 1972*b* outer partitions
1973*a*, 1973*b*, 1976*a*, 1976*b* opening
1974*a*, 1975*a* partition
2200 SOT module
2205 piezoelectric composite
2210*a*-2210*d*, 2280 piezoelectric element
2220*a*-2220*d* elastic body
t1-t5 piezoelectric module (for testing)
u1-u5 elastic body
v1 piezoelectric element
w1 vibration plate

The invention claimed is:

1. A SoT module comprising:

a plate-shaped piezoelectric composite for generating bending vibration by the impression of an AC voltage, a plurality of elastic bodies, one ends of which are bonded to the main surface of the piezoelectric composite, the elastic bodies transmitting vibration of the piezoelectric composite, and a vibration plate has a main surface which is bonded to the other ends of the elastic bodies, wherein the piezoelectric composite comprises a piezoelectric element formed in a rectangular plate, there is a position of the centroid of the piezoelectric composite between the plurality of elastic bodies, the piezoelectric composite comprises a plurality of piezoelectric elements, each of which is identical to the piezoelectric element, and each of the piezoelectric elements is partially connected to each other, and a loop structure for amplifying the displacement is formed for each of the plurality of piezoelectric elements by one end of the piezoelectric element being bonded to the other piezoelectric elements.

2. The SoT module according to claim 1, wherein a position where the other end is bonded for each of the plurality of piezoelectric elements is a central portion of the other of the piezoelectric elements.

3. The SoT module according to claim 1, wherein a position where the other end of each of the plurality of piezoelectric elements is bonded is an intermediate portion between a central portion and an end portion of the other of the piezoelectric elements.

4. The SoT module according to claim 1, wherein a position where the other end of each of the plurality of piezoelectric elements is bonded is an end of the other of the piezoelectric elements.

5. The SoT module according to claim 1, wherein a part of an automobile is used for the vibration plate, and the part is installed in the automobile.

6. The SoT module according to claim 1, wherein a part or accessory of an electrical product is used for the vibration plate, and the part or accessory of the electrical product is installed in the accessory or electrical product.

* * * * *